United States Patent
Nakamura et al.

(10) Patent No.: US 7,362,524 B2
(45) Date of Patent: Apr. 22, 2008

(54) MAGNETIC PATTERN TRANSFER METHOD

(75) Inventors: Yutaka Nakamura, Kawasaki (JP);
Hitoshi Komoriya, Kawasaki (JP);
Hiroyuki Suzuki, Kawasaki (JP);
Takao Hirahara, Kawasaki (JP); Arata Ejiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/113,137

(22) Filed: Apr. 25, 2005

(65) Prior Publication Data

US 2005/0185311 A1 Aug. 25, 2005

Related U.S. Application Data

(63) Continuation of application No. PCT/JP03/04188, filed on Apr. 1, 2003.

(51) Int. Cl.
*G11B 5/86* (2006.01)
(52) U.S. Cl. .................................................. 360/17
(58) Field of Classification Search .................. None
See application file for complete search history.

(56) References Cited

U.S. PATENT DOCUMENTS

| | | | |
|---|---|---|---|
| 6,469,848 B1 * | 10/2002 | Hamada et al. | 360/17 |
| 6,613,459 B1 * | 9/2003 | Saito et al. | 428/832.1 |
| 6,636,371 B1 * | 10/2003 | Komatsu et al. | 360/16 |
| 6,731,446 B2 * | 5/2004 | Ikeda et al. | 360/59 |
| 2002/0141088 A1 | 10/2002 | Nishikawa et al. | 360/17 |
| 2002/0150794 A1 * | 10/2002 | Hamada et al. | 428/694 TM |
| 2003/0179477 A1 * | 9/2003 | Usa et al. | 360/17 |
| 2004/0148623 A1 * | 7/2004 | Rijpers et al. | 720/718 |
| 2004/0196779 A1 * | 10/2004 | Aratani et al. | 369/288 |
| 2004/0233559 A1 * | 11/2004 | Nishikawa | 360/17 |

FOREIGN PATENT DOCUMENTS

JP  7-78337  3/1995

(Continued)

OTHER PUBLICATIONS

Notice of Reasons for Rejection (Non-Final Office Action) with translation dated Nov. 20, 2007.

*Primary Examiner*—William Korzuch
*Assistant Examiner*—Daniell L. Negrón
(74) *Attorney, Agent, or Firm*—Kratz, Quintos & Hanson, LLP

(57) ABSTRACT

A magnetic pattern transfer method is disclosed. A magnetic pattern transfer master having a plurality of magnetic portions preformed with predetermined magnetic patterns is brought in proximity to a magnetic recording medium having a magnetic film to record the magnetic information, and a magnetic field is applied from an external source thereby to transfer the magnetic patterns to the magnetic recording medium. In order to improve the closeness between the magnetic film of the magnetic recording medium and the magnetic portions of the magnetic pattern transfer master, the magnetic patterns are transferred to the magnetic film of the magnetic recording medium during the process of fabricating the magnetic recording medium. Also, using a magnetic pattern transfer master with the width of each pattern groove of the magnetic patterns smaller than the width of a corresponding pattern protrusion, the relative position of the magnetic pattern transfer master is displaced, while at the same time transferring the magnetic patterns to the magnetic film of the magnetic recording medium a plurality of times.

4 Claims, 24 Drawing Sheets

FOREIGN PATENT DOCUMENTS

| | | |
|---|---|---|
| JP | 10-40544 | 2/1998 |
| JP | 11-25455 | 1/1999 |
| JP | 2000-195048 | 7/2000 |
| JP | 2001-6170 | 1/2001 |
| JP | 2001-143258 | 5/2001 |
| JP | 2001-209934 | 8/2001 |
| JP | 2002-100039 | 4/2002 |
| JP | 2002-170230 | 6/2002 |
| JP | 2002-358634 | 12/2002 |
| JP | 2002-367167 | 12/2002 |

\* cited by examiner

MAGNETIC PATTERN MP

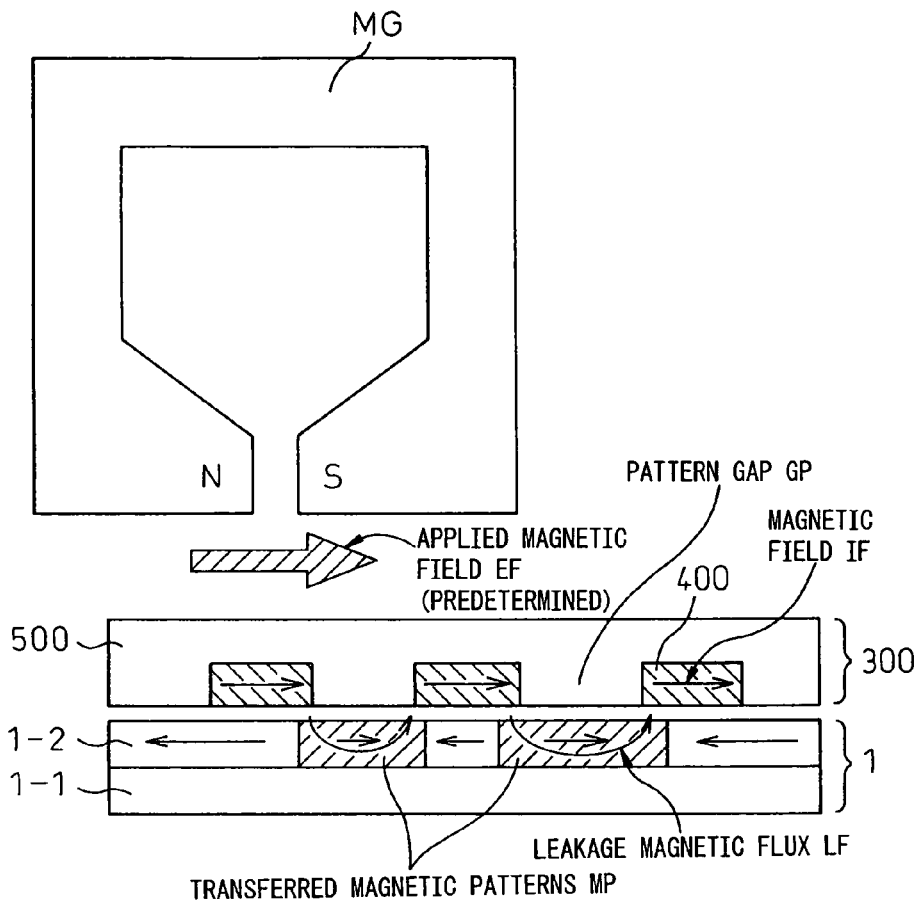
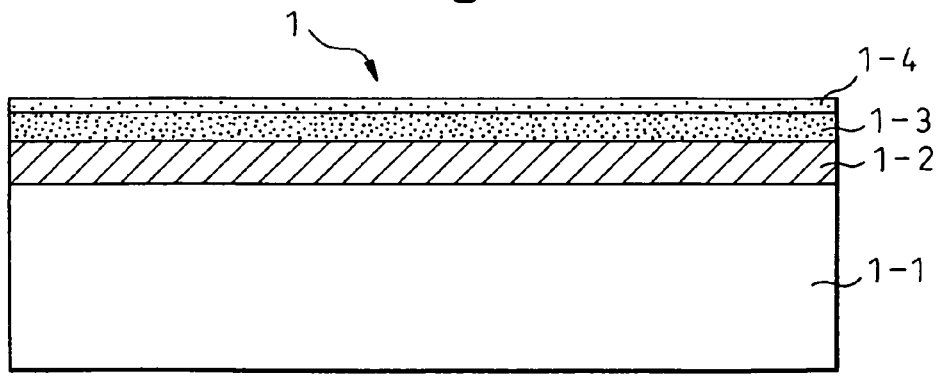

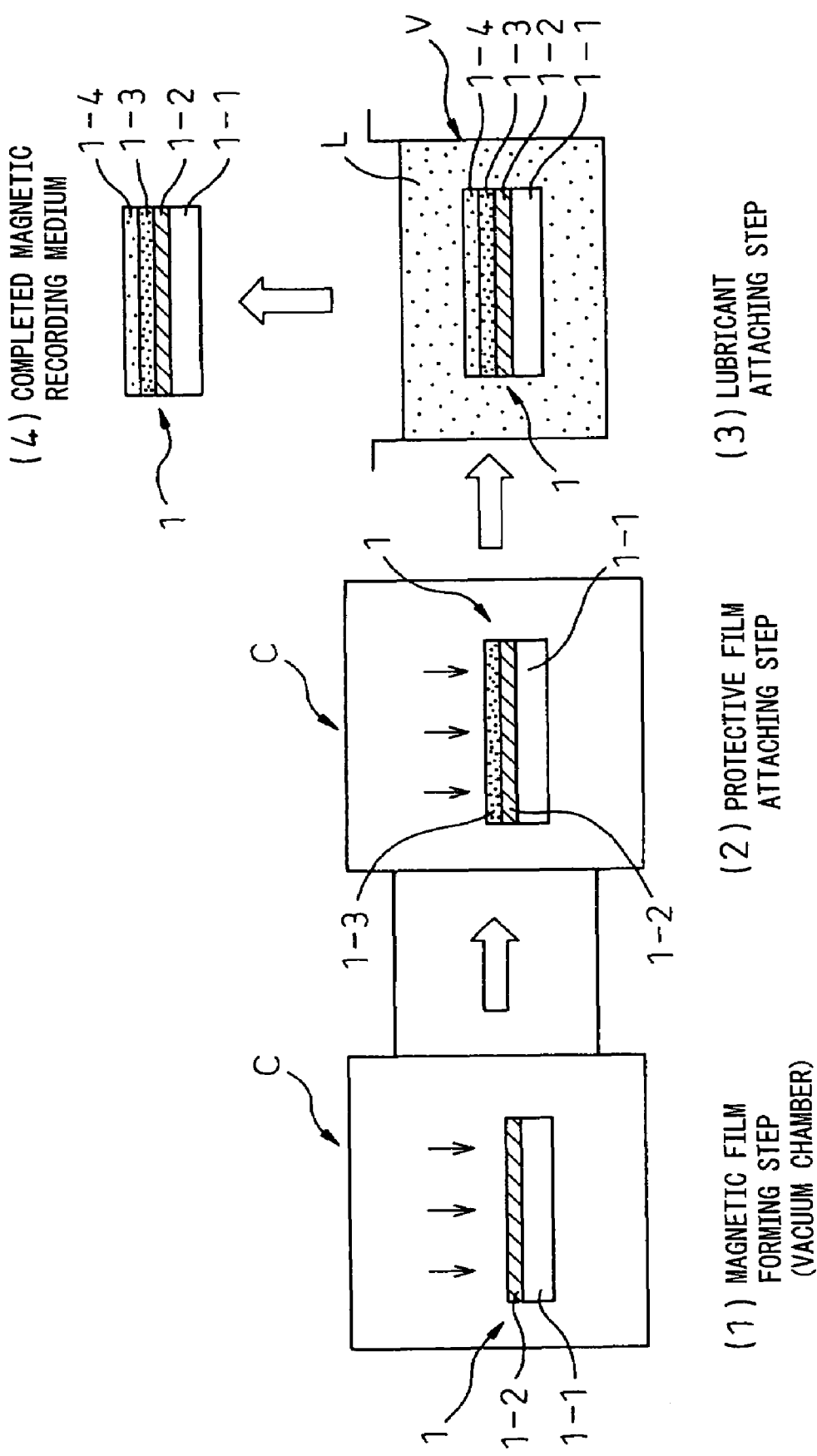

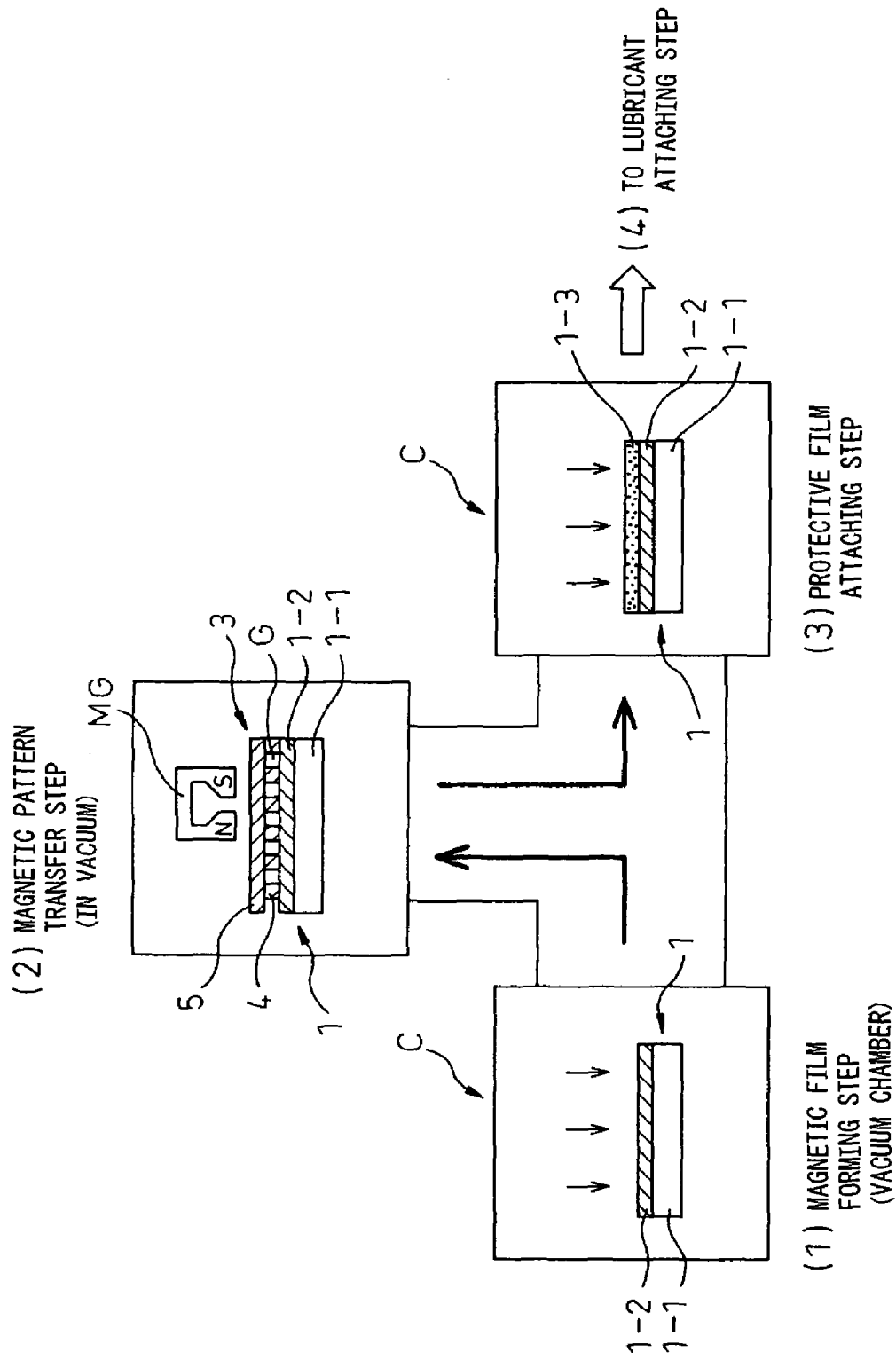

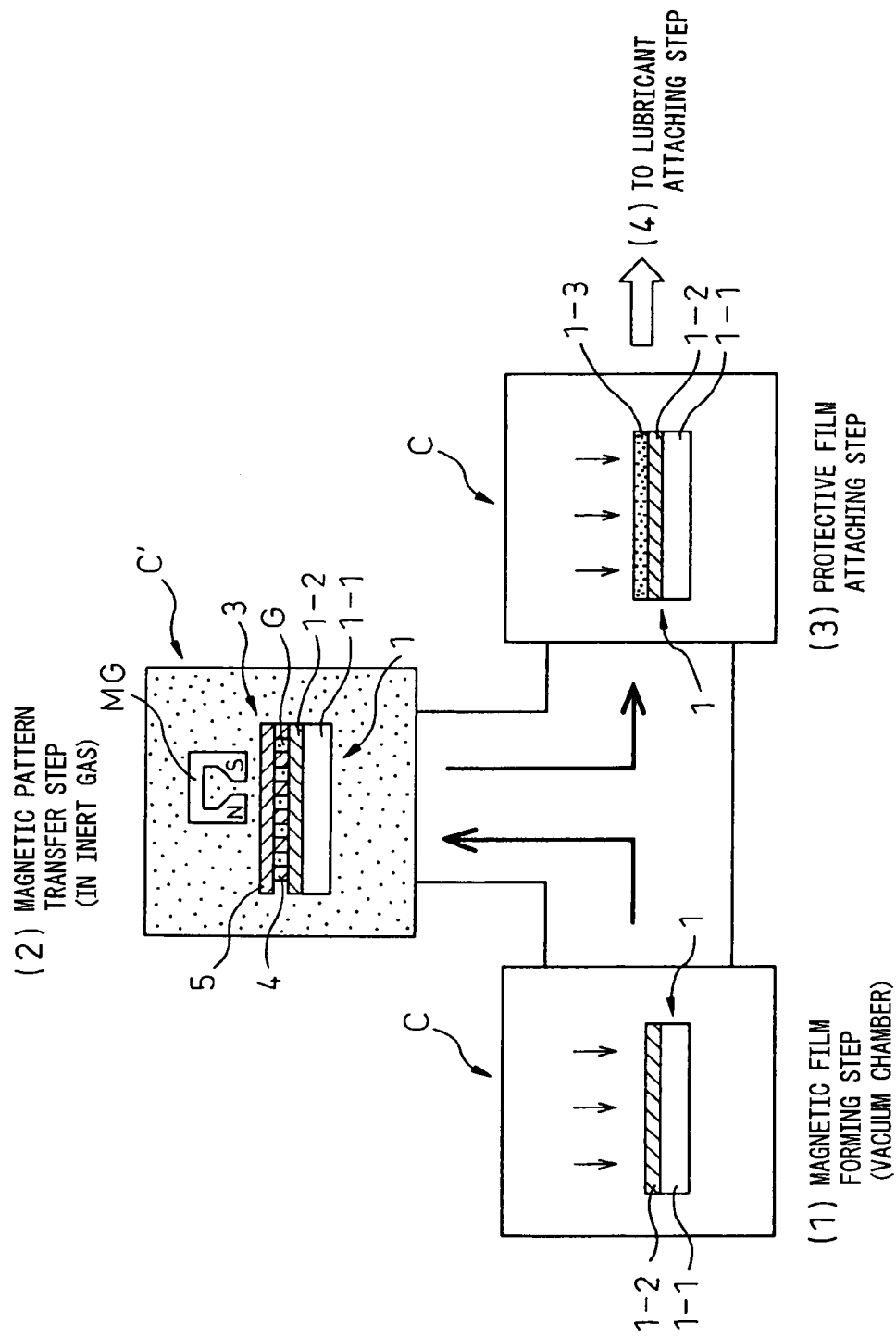

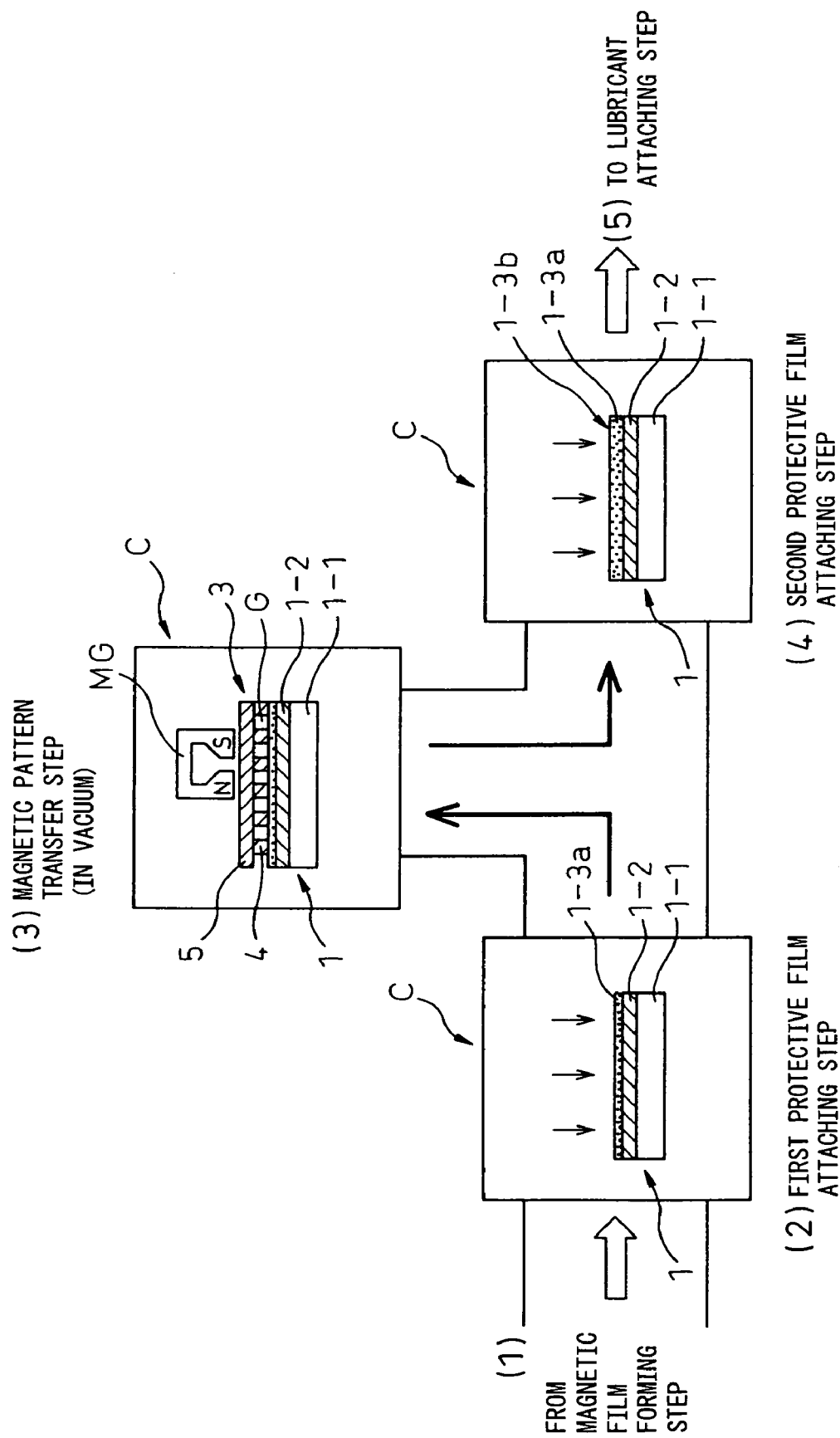

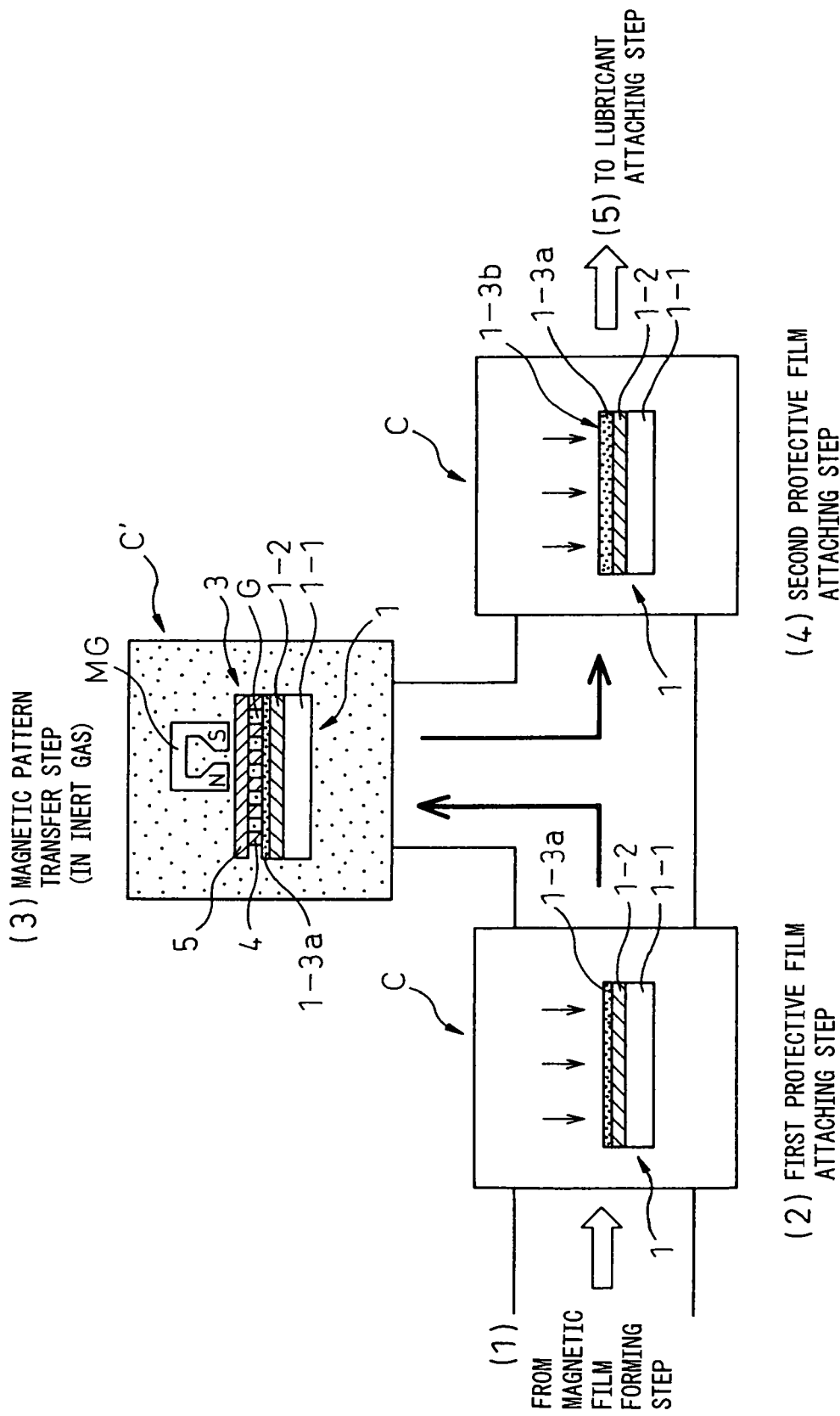

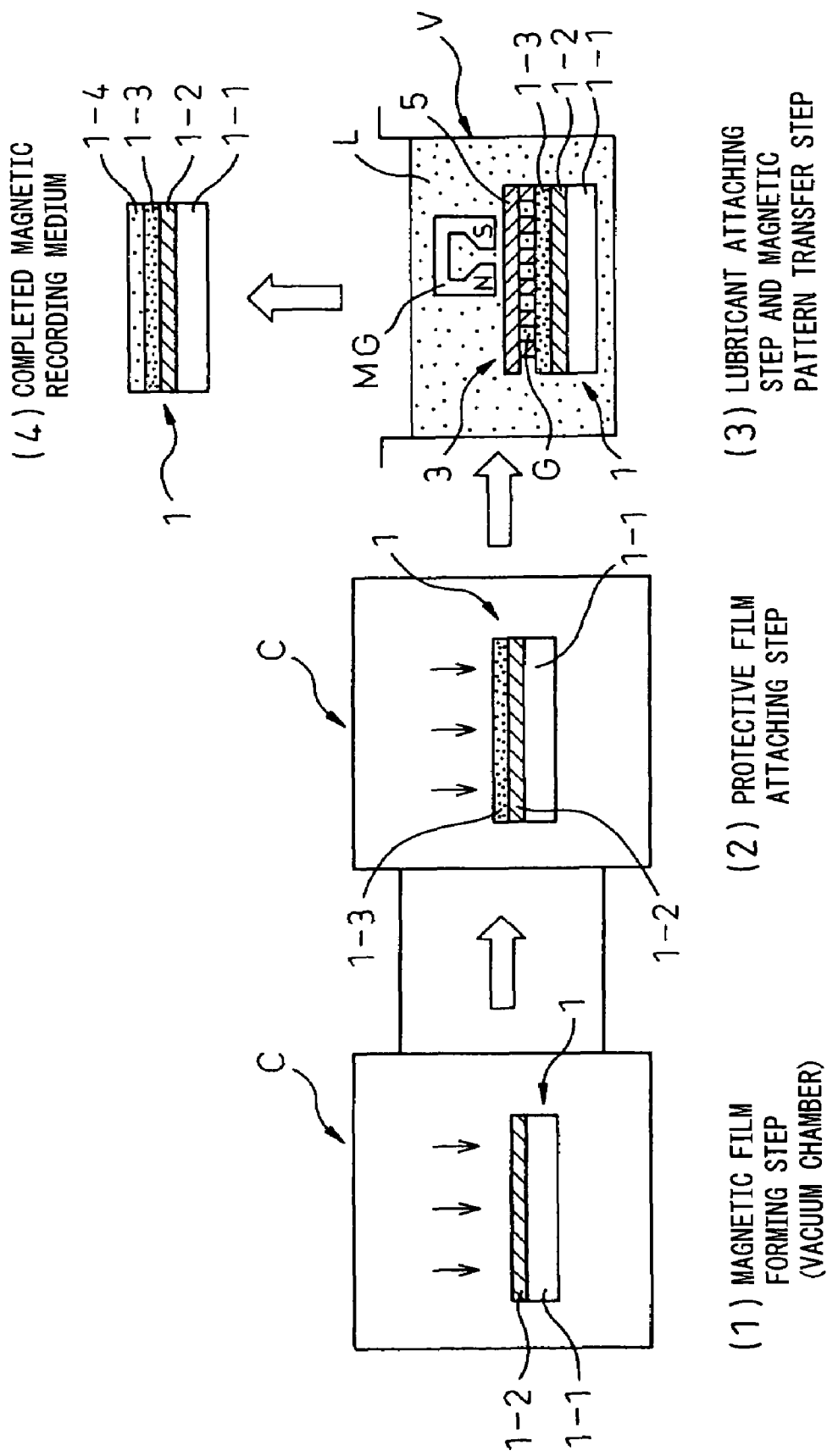

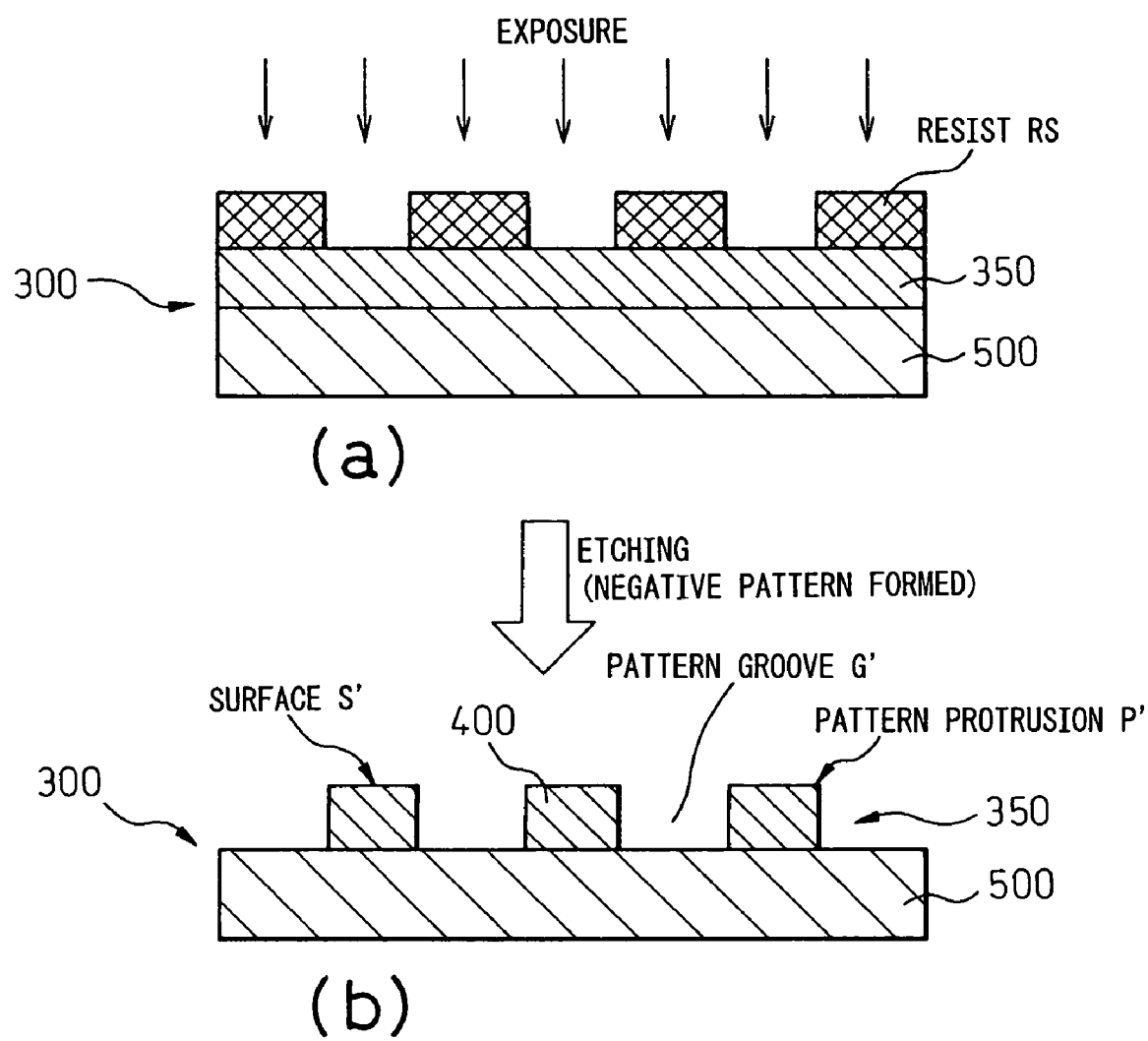

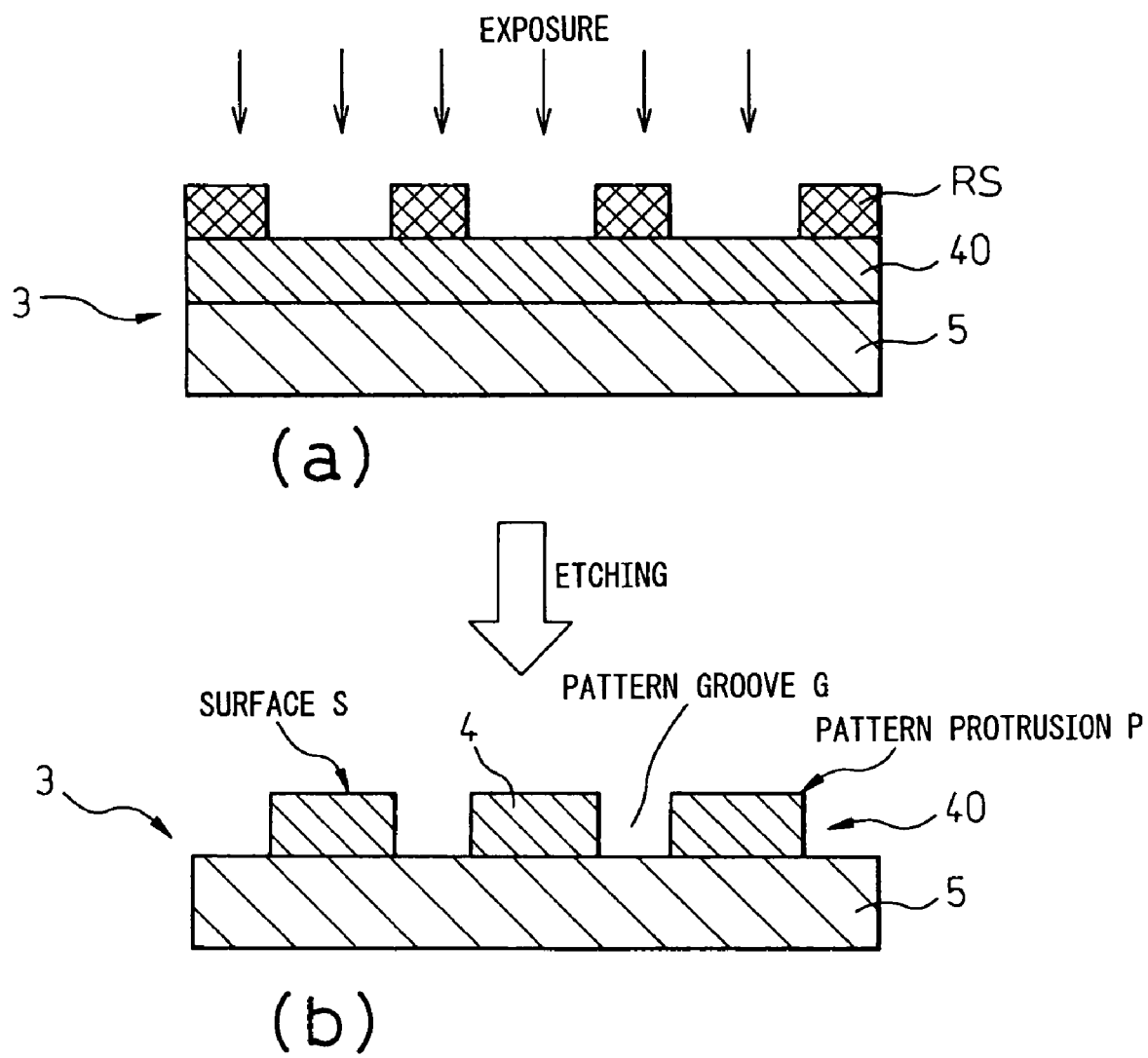

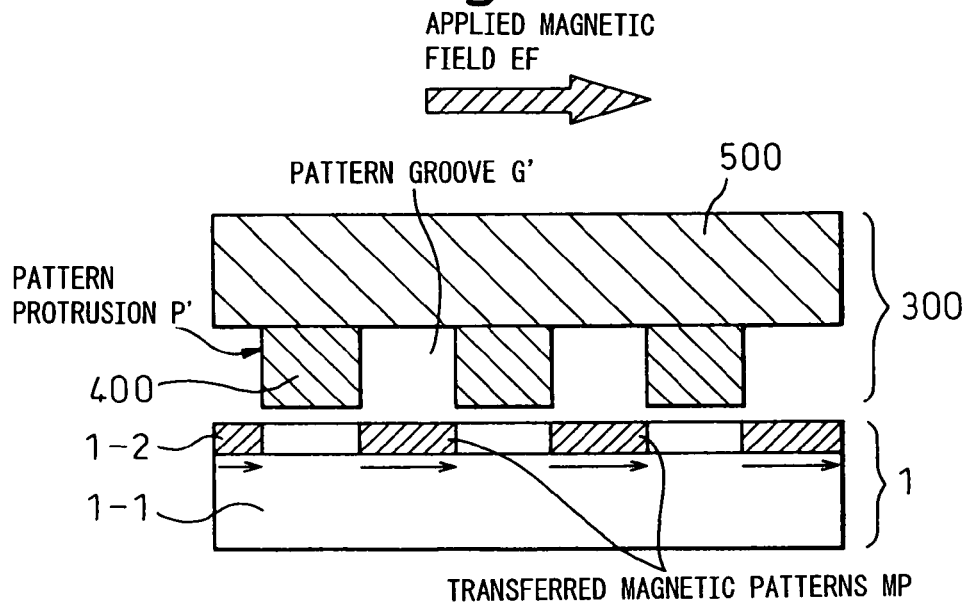
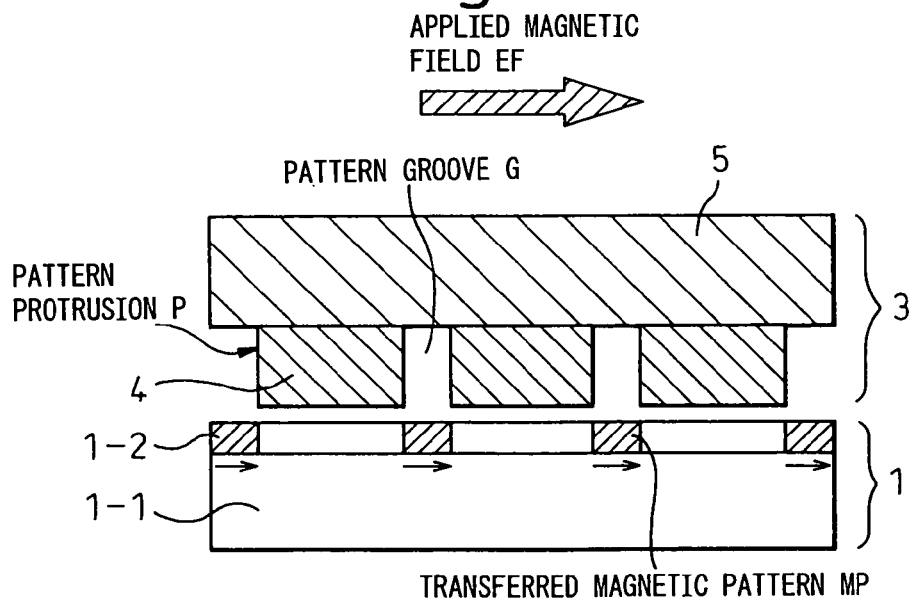

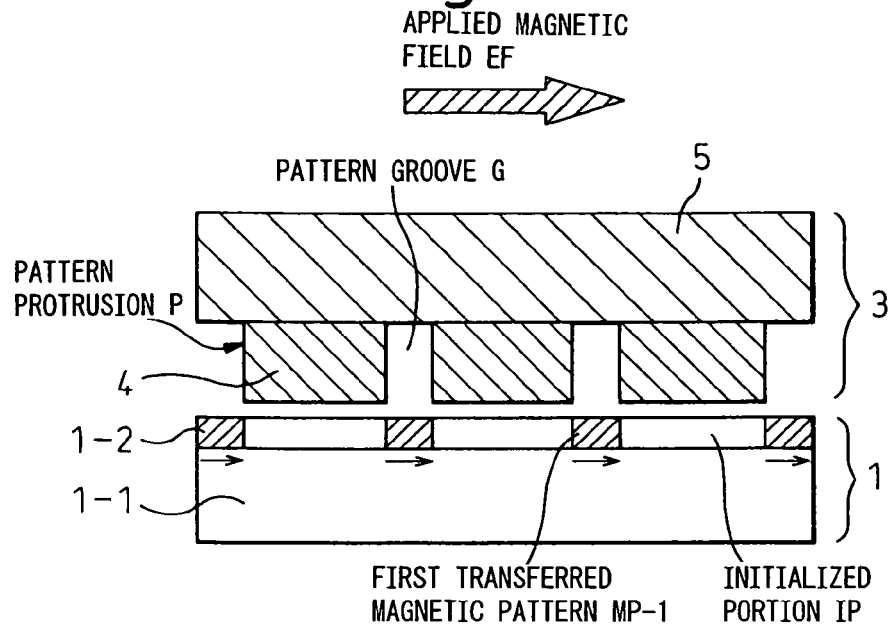
(a) FIRST TRANSFER SESSION
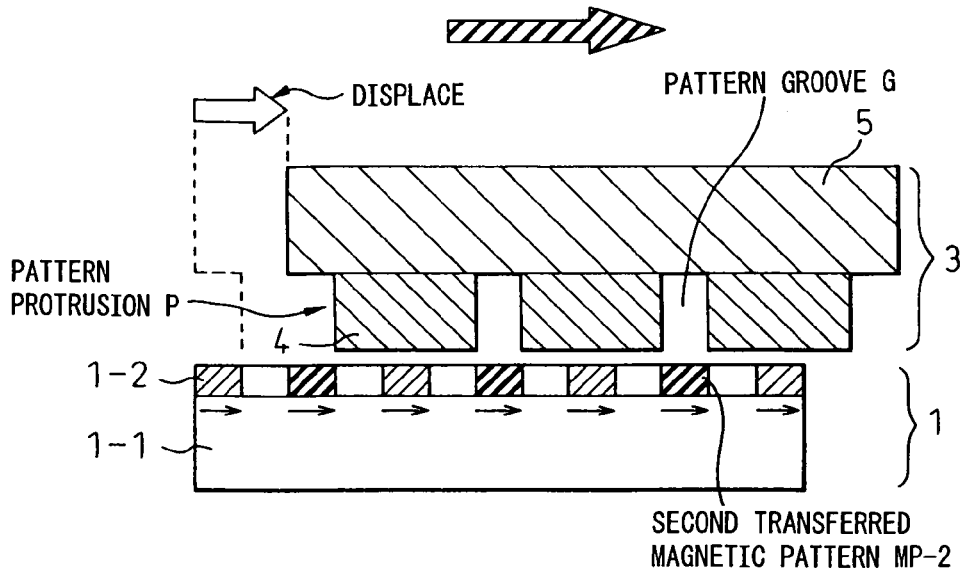
(b) SECOND TRANSFER SESSION AFTER DISPLACEMENT

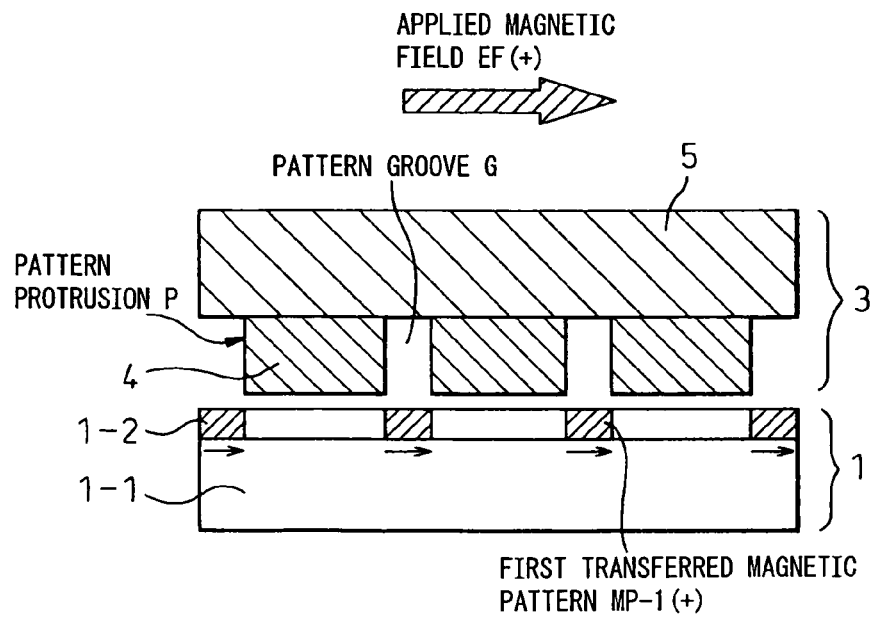
(a) FIRST TRANSFER SESSION
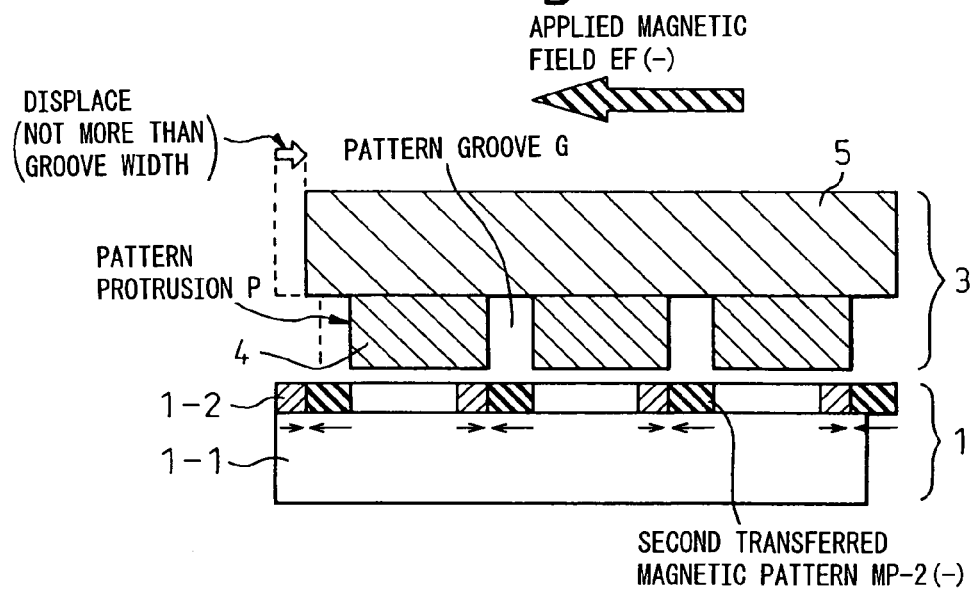
(b) SECOND TRANSFER SESSION AFTER DISPLACEMENT (c) THIRD TRANSFER SESSION AFTER DISPLACEMENT (a) TRANSFER AFTER DISPLACEMENT ONLY IN PERIPHERAL DIRECTION (b) TRANSFER AFTER DISPLACEMENT ALSO IN RADIAL DIRECTION

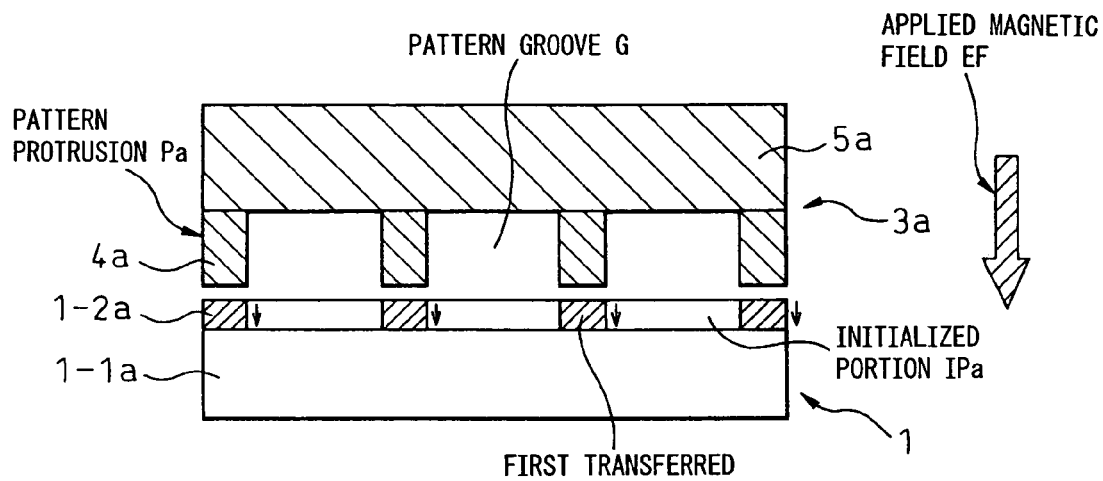
(a) FIRST TRANSFER SESSION
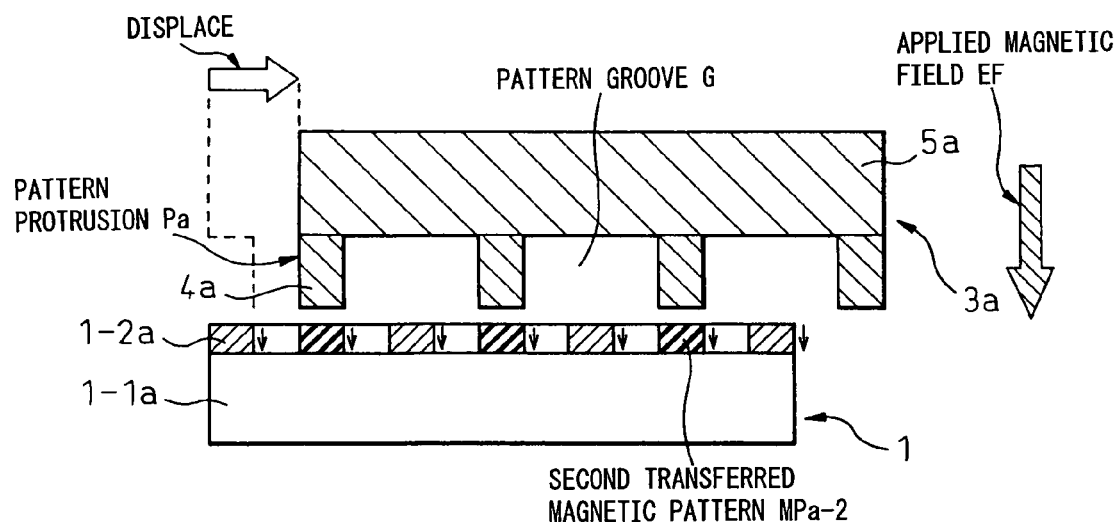
(b) SECOND TRANSFER SESSION AFTER DISPLACEMENT

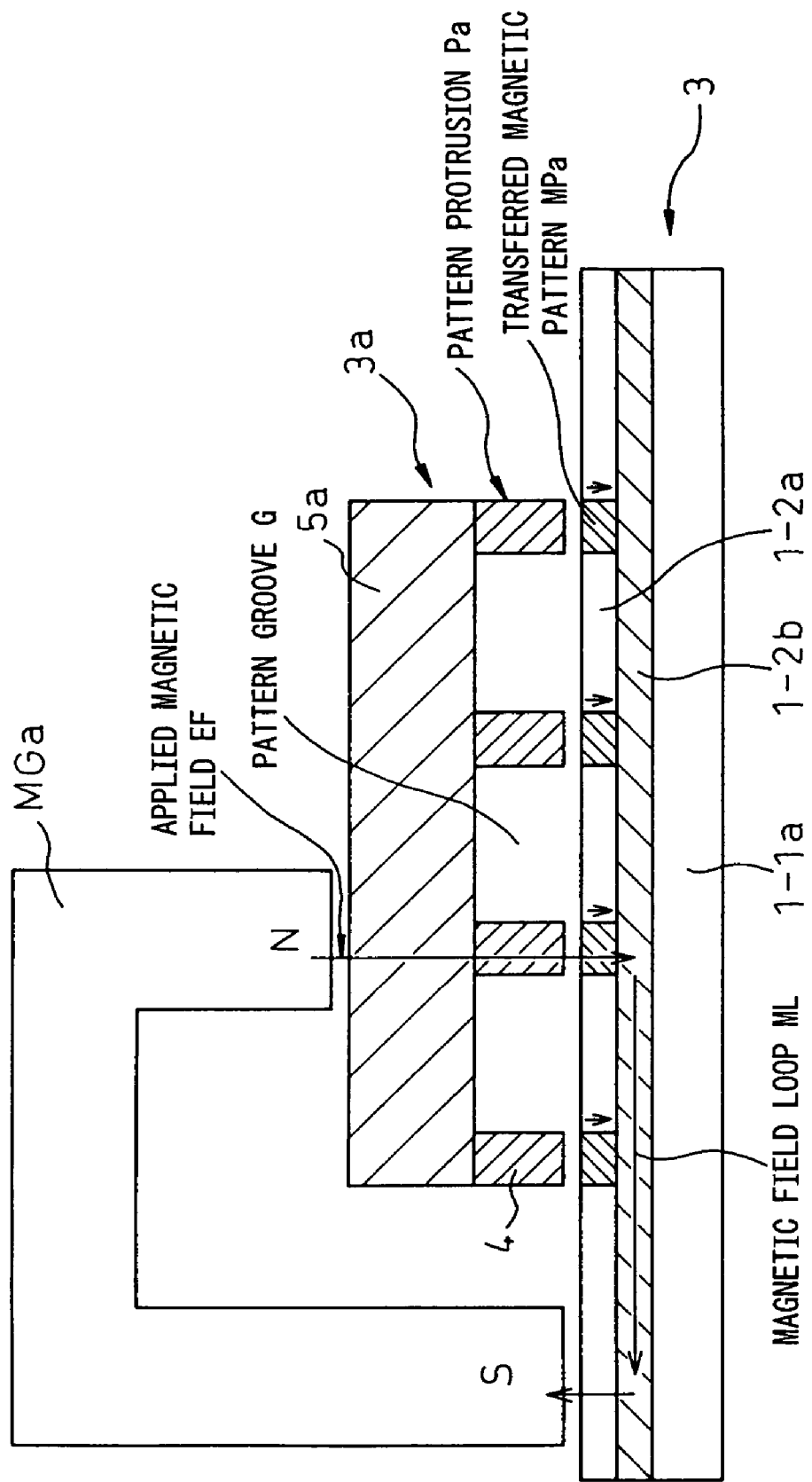

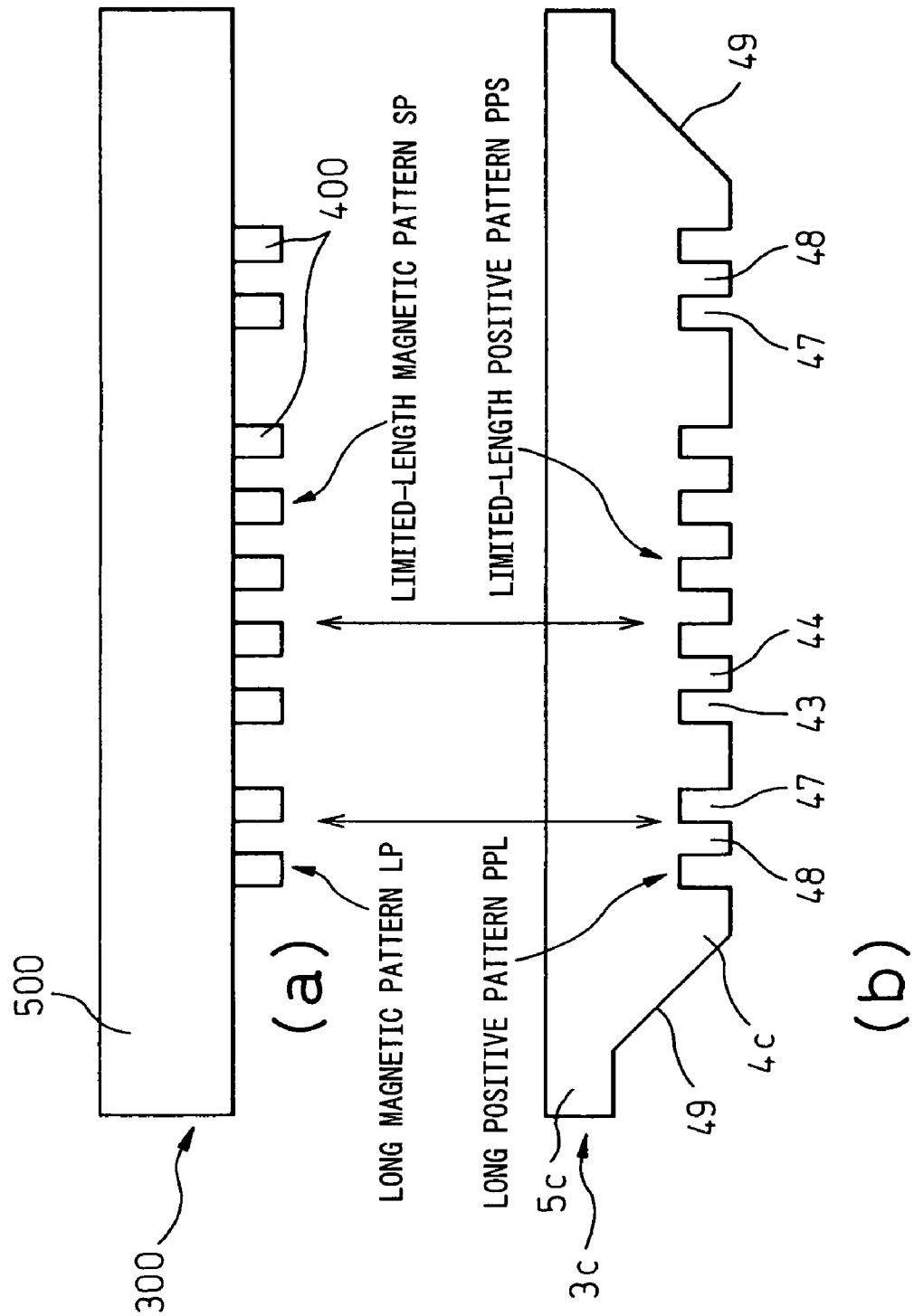

MAGNETIC PATTERN TRANSFER METHOD

CROSS REFERENCE TO RELATED APPLICATION

This is a Continuation of Application No. PCT/JP03/04188 filed on Apr. 1, 2003. The entire disclosure of the prior application is hereby incorporated by reference herein in its entirety.

BACKGROUND OF THE INVENTION

1. Field of the Invention

The present invention relates to a magnetic pattern transfer method in which a magnetic pattern containing the servo information for positioning the read/write head, etc., is transferred to a magnetic recording medium by applying an external magnetic field using a magnetic pattern transfer master preformed with the magnetic pattern.

In an information storage device such as a magnetic disk device, it is generally necessary to write, in a magnetic recording medium such as a magnetic disk in advance, a magnetic pattern containing the servo information indispensable for positioning the read/write head to conduct the operation of reading and writing the information (data).

In particular, this invention relates to a technique for transferring a magnetic pattern containing the servo information for positioning the read/write head to a magnetic recording medium with high accuracy, in order to keep up with the ever-increasing capacity and recording density of the magnetic disk device, by bringing a magnetic pattern transfer master preformed with the magnetic pattern in proximity to the magnetic recording medium and magnetizing the magnetic film of the magnetic recording medium using the leakage magnetic fluxes generated from the magnetic pattern under the effect of a magnetic field applied from an external source.

2. Description of the Related Art

In recent years, demand has increased for an information storage device such as a magnetic disk device having a large capacity, and accordingly, there is an increasing tendency toward a higher recording density of the magnetic recording medium, such as the magnetic disk. This has increasingly made it difficult to prepare a magnetic pattern containing the high-density servo information by mechanical means using a dedicated device to position the read/write head with high accuracy on the magnetic recording medium to read and write the information (data).

The necessity has arisen, on the other hand, to prepare a high-density magnetic pattern containing the servo information without using a dedicated device in order to minimize the production cost of the magnetic disk device. To meet this requirement, the conventional method is employed in which a high-density magnetic pattern containing the servo information is transferred to a magnetic recording medium using a magnetic pattern transfer master preformed with the magnetic pattern.

The principle of magnetic pattern transfer is explained briefly. A magnetic pattern transfer master preformed with a magnetic pattern containing the servo information is brought in close proximity to a magnetic recording medium, and a magnetic field is applied thereto from an external source. Then, leakage magnetic fluxes are generated in the pattern grooves (or the pattern protrusions) of the magnetic pattern. The magnetic field resulting from these leakage magnetic fluxes magnetizes the magnetic film of the magnetic recording medium in a predetermined direction, and a magnetic pattern of a size substantially corresponding to the size of each pattern groove (i.e., the width of each pattern groove) of the magnetic pattern is transferred to the magnetic film of the magnetic recording medium.

For reference, an example of the conventional magnetic pattern transfer method is disclosed in Japanese Unexamined Patent Publication (Kokai) No. 2001-6170 (Patent Document 1).

This conventional method is explained in detail in the section "DESCRIPTION OF THE PREFERRED EMBODIMENTS" herein by comparison with preferred embodiments of the present invention.

As described above, the recent increase in the capacity of the magnetic disk device has enhanced the tendency toward a higher recording density of the magnetic recording medium year by year. The resulting demand for a high-density magnetic pattern has further reduced the size of the magnetic pattern (especially, the width of the magnetic pattern) transferred to the magnetic recording medium (for example, to 50 nm ($5 \times 10^{-8}$ m) or less). The conventional method, therefore, suffers from the problem that it is difficult to prepare a magnetic pattern transfer master of high resolution having the same size as the magnetic pattern transferred to the magnetic recording medium.

In a plurality of magnetic patterns having a limited length, on the other hand, the magnetic field resulting from the leakage magnetic fluxes is weakened at the ends of the magnetic patterns. In the case in which the magnetic patterns are transferred to the magnetic recording medium, therefore, the weak magnetization of the magnetic film at the end positions of the magnetic patterns increases the variations thereof. This has given rise to the problem that the length of the magnetic patterns transferred to the magnetic recording medium lacks uniformity.

SUMMARY OF THE INVENTION

This invention has been achieved in view of the problems described above, and the primary object thereof is to provide a magnetic pattern transfer method in which a magnetic pattern containing the servo information higher in density than in the prior art can be transferred with high accuracy to a magnetic recording medium using a magnetic pattern transfer master preformed with the particular magnetic pattern while at the same time minimizing the production cost of the information storage device such a magnetic disk device.

Another object of the present invention is to provide a magnetic pattern transfer method in which a plurality of magnetic patterns having a limited length can be transferred to the magnetic recording medium as magnetic patterns having a uniform length.

In order to solve the problems described above, according to a first aspect of the present invention, there is provided a magnetic pattern transfer method, wherein a magnetic pattern transfer master having magnetic portions preformed with predetermined magnetic pattern is brought in proximity to a magnetic recording medium having a magnetic film to record the magnetic information, and a magnetic field is applied from an external source thereby to transfer the magnetic pattern onto the magnetic recording medium, and wherein in order to improve the closeness between the magnetic film of the magnetic recording medium and the magnetic portions of the magnetic pattern transfer master, the magnetic pattern is transferred to the magnetic film of the magnetic recording medium during the process of production of the magnetic recording medium.

Preferably, in the magnetic pattern transfer method according to the present invention, during the process of production of the magnetic recording medium, before forming a protective film after forming the magnetic film, the magnetic pattern is transferred in a vacuum in an environment coupled to a magnetic film-forming chamber.

Preferably, in the magnetic pattern transfer method according to the present invention, during the process of production of the magnetic recording medium, before forming a protective film after forming the magnetic film, the magnetic pattern is transferred in an inert gas in an environment coupled to the magnetic film-forming chamber.

Preferably, in the magnetic pattern transfer method according to the present invention, during the process of production of the magnetic recording medium, after forming the magnetic film and a part of the protective film, the magnetic pattern is transferred in a vacuum in an environment coupled to the magnetic film-forming chamber, and after transferring the magnetic pattern, the remaining part of the protective film is formed.

Preferably, in the magnetic pattern transfer method according to the present invention, during the process of production of the magnetic recording medium, after forming the magnetic film and a part of the protective film, the magnetic pattern is transferred in an inert gas in an environment coupled to the magnetic film-forming chamber, and after transferring the magnetic pattern, the remaining part of the protective film is formed.

Preferably, in the magnetic pattern transfer method according to the present invention, during the process of production of the magnetic recording medium, a protective film is formed after forming the magnetic film, and during the subsequent process of attaching a lubricant layer, the magnetic pattern is transferred in a liquefied lubricant in an environment coupled to the magnetic film-forming chamber.

According to another aspect of the present invention, there is provided a magnetic pattern transfer method, wherein a magnetic pattern transfer master having magnetic portions preformed with a predetermined magnetic pattern is brought in proximity to a magnetic recording medium having a magnetic film to record the magnetic information, and a magnetic field is applied from an external source thereby to transfer the magnetic pattern onto the magnetic recording medium, and wherein the magnetic pattern is transferred to the magnetic film of the magnetic recording medium a plurality of times while displacing the relative position of the magnetic pattern transfer master having the width of each of pattern grooves of the magnetic pattern smaller than the width of a corresponding pattern protrusion.

Preferably, in the magnetic pattern transfer method according to the present invention, the relative position of the magnetic pattern transfer master is displaced by a size not more than the width of the pattern groove of the magnetic pattern, while at the same time alternating the direction of the magnetic field applied from an external source thereby to transfer the magnetic pattern by overwriting a portion of the magnetic pattern.

Preferably, in the magnetic pattern transfer method according to the present invention, the relative position of the magnetic pattern transfer master is displaced in at least one of the peripheral direction and the radial direction of the magnetic recording medium thereby to transfer the magnetic pattern.

According to still another aspect of the present invention, there is provided a magnetic pattern transfer method, wherein a magnetic pattern transfer master having magnetic portions preformed with a predetermined magnetic pattern is brought in proximity to a magnetic recording medium having a magnetic film to record the magnetic information, and a magnetic field is applied from an external source thereby to transfer the magnetic pattern onto the magnetic recording medium, and wherein in the case in which a magnetic pattern portion having a limited length of the magnetic pattern transfer master is configured of a groove, the magnetic pattern is formed in such a manner as to form a round end of the magnetic pattern portion having the limited length thereby to transfer the magnetic pattern to the magnetic film of the magnetic recording medium.

Preferably, in the magnetic pattern transfer method according to the present invention, a positive resist coated on the magnetic portions of the magnetic pattern transfer master is exposed, after which the magnetic portions are etched to form a groove of the magnetic pattern portion having the limited length thereby to produce a magnetic pattern transfer master with the limited-length magnetic pattern portion having a relatively small groove width at the end thereof.

To summarize, first, according to this invention, a magnetic pattern is transferred to the magnetic film of a magnetic recording medium before forming a protective film or a lubricant layer during the process of fabricating the magnetic recording medium. Therefore, the distance between the magnetic film of the magnetic recording medium and the magnetic pattern of the magnetic pattern transfer master is shortened more than in the prior art thereby to improve the closeness between the magnetic film of the magnetic recording medium and the magnetic pattern of the magnetic pattern transfer master.

As a result, the magnetic field due to the leakage magnetic fluxes generated from the magnetic pattern of the magnetic pattern transfer master is comparatively strengthened, and by utilizing this magnetic field, a magnetic pattern higher in density than the prior art can be transferred with high accuracy to the magnetic recording medium. In this case, an expensive dedicated device is not required but a high-density magnetic pattern can be transferred by a magnetic pattern transfer master generally used. Therefore, the production cost of the magnetic disk device, etc., can be minimized.

Second, according to this invention, the magnetic pattern transfer master has each magnetic pattern groove narrower than a corresponding magnetic pattern protrusion, and therefore the magnetic pattern transfer master can be fabricated more easily than the conventional magnetic pattern transfer master having each pattern groove and each pattern protrusion of substantially the same width. Using the magnetic pattern transfer master fabricated in this way, the magnetic pattern is transferred to the magnetic film of the magnetic recording medium a plurality of times while displacing the relative position of the magnetic pattern transfer master. Without using a magnetic pattern transfer master very high in density, therefore, a magnetic pattern having the same width of each pattern groove of the magnetic pattern transfer master and higher in resolution than the prior art can be transferred to the magnetic recording medium.

In this case, since the width of the pattern protrusion of the magnetic pattern transfer master is relatively large, the magnetic field due to the leakage magnetic fluxes generated from the pattern protrusion is is comparatively strengthened, so that a magnetic pattern higher in resolution than the prior art can be easily transferred utilizing this magnetic field.

Third, according to this invention, in the case in which a plurality of magnetic patterns having a limited length each configured of a groove are included in the magnetic patterns of the magnetic pattern transfer master, the plurality of the magnetic patterns are formed to have a round end corner, and using the magnetic pattern transfer master formed with such magnetic patterns, the magnetic patterns are transferred to the magnetic film of the magnetic recording medium.

As a result, the width of each groove at the end of the plurality of the magnetic patterns is relatively reduced, and the strength curve of the magnetic field generated at the end of the magnetic patterns becomes steep as compared with in the prior art. Therefore, the boundary becomes clear between the magnetized portion and non-magnetized portion at the end of the magnetic patterns transferred to the magnetic film of the magnetic recording medium. Consequently, the length irregularities of the magnetic patterns transferred to the magnetic film are avoided, and a plurality of magnetic patterns having a limited length can be transferred with high definition to the magnetic recording medium.

BRIEF DESCRIPTION OF THE DRAWINGS

The above and other objects, features and advantages will be made apparent by the detailed description taken in conjunction with the accompanying drawings, in which:

FIG. 2 is a schematic diagram for explaining a typical conventional magnetic pattern transfer method;

FIG. 3 is a front view showing a general structure of an ordinary magnetic recording medium;

FIG. 4 is a flowchart showing the fabrication process of an ordinary magnetic recording medium FIG. 5 is a flowchart for explaining the magnetic pattern transfer method according to a first embodiment of the present invention;

FIG. 6 is a flowchart for explaining the magnetic pattern transfer method according to a second embodiment of the present invention;

FIG. 7 is a flowchart for explaining the magnetic pattern transfer method according to a third embodiment of the present invention;

FIG. 8 is a flowchart for explaining the magnetic pattern transfer method according to a fourth embodiment of the present invention;

FIG. 9 is a flowchart for explaining the magnetic pattern transfer method according to a fifth embodiment of the present invention;

FIG. 10 is a plan view showing an example of the magnetic pattern transfer master used in the conventional magnetic pattern transfer method;

FIG. 11 is a schematic diagram for explaining the magnetic pattern transfer method according to a sixth embodiment of the present invention;

FIG. 12 is a schematic diagram showing an example of the magnetic pattern transferred by the conventional magnetic pattern transfer method;

FIG. 13 is a schematic diagram for explaining the magnetic pattern transfer method according to a seventh embodiment of the present invention;

FIG. 14 is a first schematic diagram showing a first specific example of the magnetic pattern transfer method according to the embodiment of FIG. 13;

FIG. 15 is a second schematic diagram showing the first specific example of the magnetic pattern transfer method according to the embodiment of FIG. 13;

FIG. 16 is a first schematic diagram showing a second specific example of the magnetic pattern transfer method according to the embodiment of FIG. 13;

FIG. 17 is a second schematic diagram showing a second specific example of the magnetic pattern transfer method according to the embodiment of FIG. 13;

FIG. 25 is a first schematic diagram for explaining the magnetic pattern transfer method according to a 12th embodiment of the present invention;

FIG. 26 is a second schematic diagram for explaining the magnetic pattern transfer method according to a 12th embodiment of the present invention;

FIG. 27 is a schematic diagram for explaining the magnetic pattern transfer method according to a 13th embodiment of the present invention;

FIG. 32 is a schematic diagram for explaining the magnetic pattern transfer method according to a 15th embodiment of the present invention.

DESCRIPTION OF THE PREFERRED EMBODIMENTS

First, to clarify the features, advantages and the operational effects brought about by the magnetic pattern transfer method according to the present invention, an ordinary magnetic pattern transfer method to which the present invention is not applicable is explained with reference to the accompanying drawings (FIGS. 1 to 4).

Figure 1:
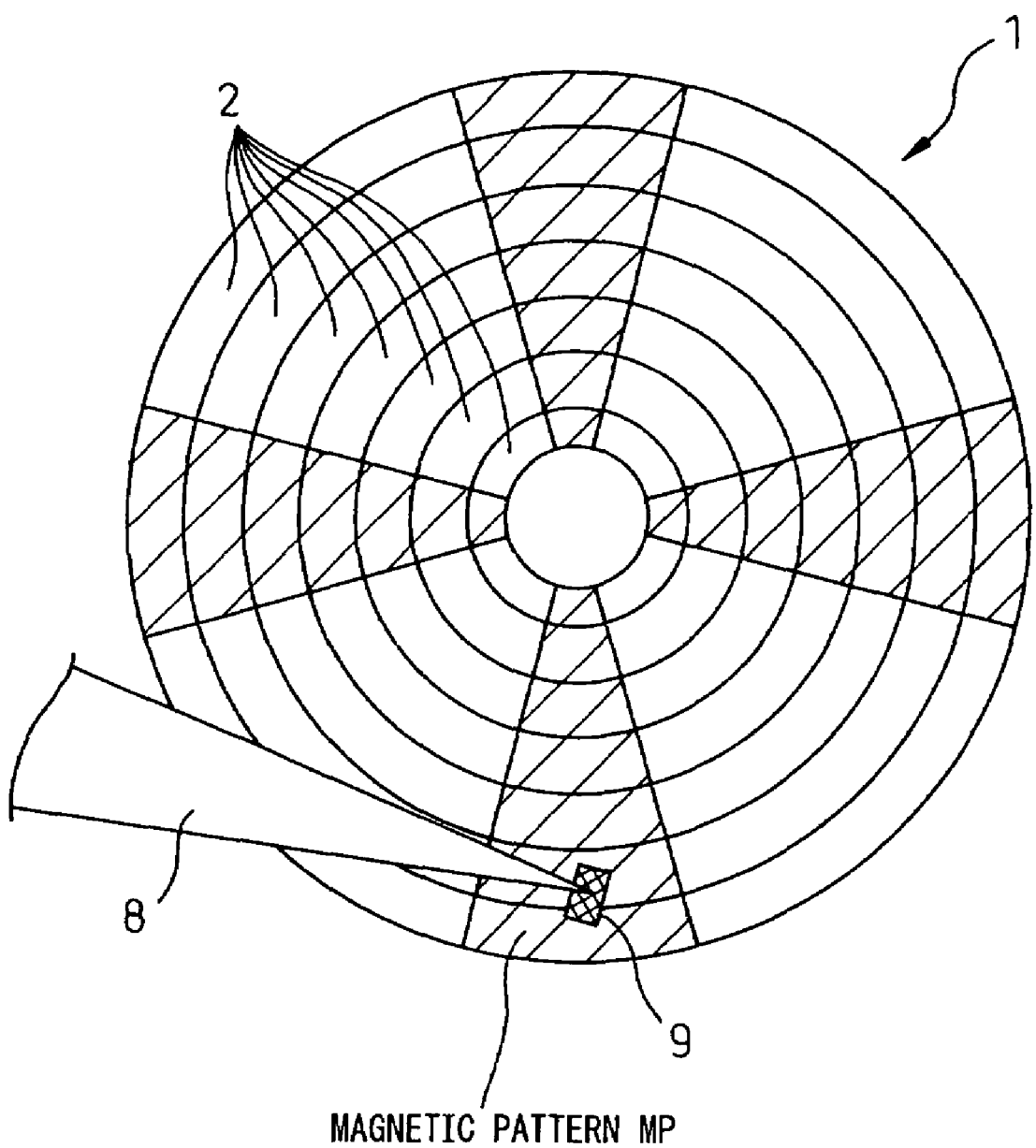
FIG. 1 is a schematic diagram showing an example of arrangement of a magnetic pattern transferred to a magnetic recording medium.

FIG. 1 is a schematic diagram showing an example of arrangement of the magnetic pattern transferred to a magnetic recording medium, and FIG. 2 a schematic diagram for explaining a typical conventional magnetic pattern transfer method.

In this case, only a magnetic recording medium 1 is shown as a representative one of a plurality of magnetic recording media (a plurality of magnetic disks, for example) included in an ordinary magnetic disk device. In the description that follows, similar or identical component parts are designated by the same reference numerals, respectively.

As shown in FIG. 1, assume that the operation of reading and writing information (data) from and into an ordinary magnetic disk device is performed. A read/write head 9 supported on an arm 8 is moved to a predetermined position on tracks 2 on a magnetic recording medium 1, and information is written in or read from the particular position. For this purpose, normally, a magnetic pattern MP containing the servo information required to set the read/write head 9 at a predetermined position on the tracks 2 with high accuracy is written in advance in the magnetic recording medium 1. The magnetic recording medium 1 includes a nonmagnetic medium base 1-1 (FIG. 2) and a magnetic film 1-2 (FIG. 2) formed on the medium base 1-1. A plurality of tracks 2 are arranged concentrically from the inner diameter portion to the outer diameter portion of the magnetic film 1-2 of the magnetic recording medium 1. A magnetic pattern MP including a plurality of pattern blocks is formed as a sectorial area.

According to the prior art, in order to minimize the production cost of the magnetic disk device, a method has been employed in which a magnetic pattern containing high-density servo information is easily formed without using an expensive dedicated device.

Specifically, in the conventional method, as shown in FIG. 2, using a magnetic pattern transfer master 300 having a magnetic portion 400 preformed with a magnetic pattern to be transferred, the magnetic pattern is transferred to the magnetic film 1-2 of the magnetic recording medium 1. Thus, the intended magnetic pattern MP is written in advance in the magnetic recording medium 1. As a typical example of the magnetic pattern transfer master used to transfer the magnetic pattern, the magnetic pattern transfer master 300 is shown to include the nonmagnetic master base (i.e. master board) such as a silicon board 500 and the magnetic portion 400 with the intended magnetic pattern embedded in the master base 500.

A typical conventional magnetic pattern transfer method is explained in more detail below with reference to FIG. 2. First, the magnetic pattern transfer master 300 having the magnetic portion 400 preformed with a magnetic pattern containing the servo information is brought in proximity to the magnetic recording medium 1. Next, a permanent magnet MG is arranged from outside to cover the magnetic portion 400 of the magnetic pattern transfer master 300. A predetermined magnetic field EF generated between N and S poles of the permanent magnets MG is applied to the magnetic pattern transfer master 300.

The applied magnetic field EF from an external source magnetizes each magnetic pattern of the magnetic portion 400 in the same direction as the applied magnetic field EF (i.e. the direction parallel to the surface of the magnetic recording medium 1 and the magnetic pattern transfer master 300), and a magnetic field IF is generated in the magnetic pattern. At the same time, leakage magnetic fluxes LF are generated in the pattern gaps (i.e. the pattern grooves) GP between adjacent magnetic patterns. The magnetic field due to the leakage magnetic fluxes LF magnetizes the magnetic film 1-2 of the magnetic recording medium 1 in the same direction as the applied magnetic field EF from an external source. In this way, the magnetic patterns MP each of a size substantially corresponding to the pattern gap GP of the magnetic pattern are transferred to the magnetic film 1-2 of the magnetic recording medium 1.

Actually, a gap exists between the magnetic pattern transfer master 300 and the magnetic recording medium 1, and as a result of this gap, the leakage magnetic fluxes LF circumvent under the magnetic patterns of the magnetic pattern transfer master 300. Therefore, it should be noted that the size of each magnetic pattern MP transferred to the magnetic film 1-2 of the magnetic recording medium 1 is slightly larger than the size of the pattern gap GP.

FIG. 3 is a front view showing a general structure of an ordinary magnetic recording medium. FIG. 4 is a flowchart showing the fabrication process of the ordinary magnetic recording medium.

With the increase in the recording density of the magnetic recording medium 1 and the resulting decrease in the size of the magnetic pattern of the magnetic pattern transfer master 300, the magnetic field resulting from the leakage magnetic fluxes LF generated at the time of transfer of the magnetic pattern to the magnetic recording medium 1 is weakened correspondingly. On the other hand, the magnetic field due to the leakage magnetic fluxes generated by the transfer is stronger, the nearer to the magnetic pattern transfer master 300. Therefore, the distance between the magnetic film 1-2 of the magnetic recording medium 1 and the magnetic portions 400 of the magnetic pattern transfer master 300 is required to be shortened as much as possible.

Normally, however, as shown in FIG. 3, a protective film 1-3 and a lubricant layer 1-4 about 10 nm ($10^{-8}$ m) are formed on the magnetic film 1-2 on the surface of the magnetic recording medium 1 after completion of the entire film-forming process. More specifically, in the case where the magnetic recording medium 1 is fabricated through the normal fabrication process, as shown in FIG. 4, the magnetic film 1-2 is formed on the nonmagnetic medium base 1-1 by the vacuum deposition method in a vacuum chamber C at the first step (1) of depositing the magnetic film. Next, at the second step (2) of forming the protective film, the protective film 1-3 such as a DLC (diamond-like carbon) film is formed on the magnetic film 1-2 by the vacuum deposition method in the same vacuum chamber C.

Further, at the third step (3) of lubricant deposition, a lubricant layer 1-4 is formed on the protective film 1-3 by dipping the magnetic recording medium 1 in a vessel V filled with the lubricant L in liquid form such as fluorine lubricant. In this way, all the steps of the film forming process for the magnetic recording medium 1 are completed (the completed product (4) of the magnetic recording medium 1). The magnetic pattern is transferred to the magnetic film 1-2 of the magnetic recording medium 1 thus completed.

As is obvious from FIGS. 3 and 4, in the normal fabrication process of the magnetic recording medium 1, the protective film 1-3 and the lubricant layer 1-4 about 10 nm thick are formed on the magnetic film 1-2, and therefore the distance between the magnetic film 1-2 of the magnetic recording medium 1 and the magnetic portions 400 of the magnetic pattern transfer master 300 cannot be shortened any more.

In the magnetic pattern transfer method according to the present invention, in contrast, as explained in the first to sixth embodiments later, a magnetic pattern is transferred to the magnetic film of the magnetic recording medium during the process of fabricating the magnetic recording medium. By thus shortening the distance between the magnetic film of the magnetic recording medium and the magnetic portions of the magnetic pattern transfer master, the closeness between the magnetic recording medium and the magnetic pattern transfer master is improved.

As a conventional technique related to the magnetic pattern transfer method according to the present invention, a method is disclosed in Japanese Unexamined Patent Publication (Kokai) No. 2001-6170 (published on Jan. 12, 2001) cited above in which a lubricant layer is formed on the surface of a magnetic disk after a magnetic pattern is transferred to the magnetic portions of the magnetic disk using a magnetic pattern transfer master. This conventional technique, however, simply provides a method of coating a lubricant layer on the surface of the magnetic disk to which the magnetic pattern is transferred, for the sole purpose of avoiding the generation of an abnormal protrusion on the surface of the magnetic disk.

According to this invention, in contrast, for the purpose of reducing the distance between the magnetic recording medium and the magnetic pattern transfer master, as described above, a magnetic pattern is transferred to the magnetic film of the magnetic recording medium before forming a protective film or a lubricant layer during the process of fabricating the magnetic recording medium. In other words, according to this invention, the lubricant layer is formed after transfer of the magnetic pattern only as a means to increase the closeness between the magnetic recording medium and the magnetic pattern transfer master, and therefore this invention is based on a technical concept different from that of the prior art described above.

The magnetic pattern transfer method according to first to sixth embodiments of the present invention is described in detail below with reference to the accompanying drawings (FIGS. 5 to 11).

FIG. 5 is a flowchart for explaining the magnetic pattern transfer method according to a first embodiment of the present invention. In this flowchart, however, the fabrication process of the magnetic recording medium 1 related to the magnetic pattern transfer method according to the present invention is shown in simplified fashion.

As shown in FIG. 5, according to the first embodiment of the present invention, at the first step (1) of forming a magnetic film, as in the prior art, a magnetic film 1-2 is formed on a nonmagnetic medium base 1-1 by the vacuum deposition method in a vacuum chamber C. Next, as shown in the second step (2) of magnetic pattern transfer, after forming the magnetic film 1-2 before forming the protective film 1-3, the magnetic pattern is transferred to the magnetic film 1-2 of the magnetic recording medium 1 in the vacuum chamber C to form the magnetic film or in a vacuum environment coupled to the vacuum chamber C.

Now, the method of transferring the magnetic pattern in the second magnetic pattern transfer step (2) is explained in more detail. First, a magnetic layer is formed on the nonmagnetic master base (i.e. master board) 5 such as a silicon substrate of the magnetic pattern transfer master 3, and a magnetic pattern having pattern grooves G is preformed, by exposure or etching, on the magnetic layer. Next, the magnetic pattern transfer master 3 having the magnetic portions 4 preformed with the magnetic pattern is brought in proximity to the magnetic recording medium 1. Further, a permanent magnet MG is arranged from outside in such a manner as to cover the magnetic portions 4 of the magnetic pattern transfer master 3. A predetermined magnetic field generated between the N and S poles of the permanent magnetic MG is applied to the magnetic pattern transfer master 3.

This externally applied magnetic field magnetizes each magnetic pattern of the magnetic portions 4 in the same direction as the applied magnetic field (i.e. in the direction parallel to the surfaces of the magnetic recording medium 1 and the magnetic pattern transfer master 3), and a magnetic field is generated in the magnetic pattern. At the same time, leakage magnetic fluxes are generated in the pattern groove G between each adjacent magnetic patterns. The magnetic field due to the leakage magnetic fluxes magnetizes the magnetic film 1-2 of the magnetic recording medium 1 in the same direction as the externally applied magnetic field. Thus, a magnetic pattern having a size corresponding to each pattern groove G of the corresponding magnetic pattern of the magnetic pattern transfer master 3 is transferred to the magnetic film 1-2 of the magnetic recording medium 1.

After transfer of the magnetic pattern, as shown in the third step (3) of attaching the protective film, the protective film 1-3 is formed on the magnetic film 1-2 by the vacuum deposition method in the vacuum chamber C. Further, at the fourth step (4) of attaching a lubricant layer, the magnetic recording medium 1 is dipped in a vessel C filled with the liquid of the lubricant L, thereby forming a lubricant layer 1-4 on the protective film 1-3 (not shown). In this way, the fabrication process of the magnetic recording medium 1 is completed.

According to the first embodiment shown in FIG. 5, each magnetic pattern is formed on the magnetic film of the magnetic recording medium before attaching the protective film and the lubricant layer, and therefore, the distance between the magnetic film of the magnetic recording medium and the magnetic portions of the magnetic pattern transfer master is shortened as compared with the prior art. Thus, the closeness between the magnetic recording medium and the magnetic pattern transfer master is increased, thereby making possible a high-density magnetic pattern transfer.

Further, according to the first embodiment, the increased closeness between the magnetic recording medium and the magnetic pattern transfer master substantially eliminates the gap between the magnetic pattern transfer master and the magnetic recording medium. As a result, the leakage magnetic fluxes are prevented from circumventing under the magnetic patterns of the magnetic pattern transfer master. Thus, the size of each magnetic pattern transferred to the magnetic film of the magnetic recording medium is substantially the same as the size of the corresponding pattern groove G.

The magnetic film is generally formed of a metal such as iron and therefore easily oxidized. Before the protective film is formed on the magnetic film as in the first embodiment (in particular, at the magnetic pattern transfer step (2)) shown in FIG. 5, each magnetic pattern is desirably transferred in a vacuum to prevent oxidization of the magnetic film.

FIG. 6 is a flowchart for explaining the magnetic pattern transfer method according to a second embodiment of the present invention. Also in this case, the fabrication process of the magnetic recording medium 1 related to the magnetic pattern transfer method according to the present invention is shown in simplified fashion.

As shown in FIG. 6, according to the second embodiment of the present invention, in the first step (1) of forming a magnetic film, as in the prior art, the magnetic film 1-2 is formed on the nonmagnetic medium base 1-1 by the vacuum deposition method in the vacuum chamber C. Next, as shown in the second step (2) of magnetic pattern transfer, before forming the protective film 1-3 after forming the magnetic film 1-2, the magnetic pattern is transferred to the magnetic film 1-2 of the magnetic recording medium 1 in an inert gas atmosphere (for example, in the chamber C' filled with an inert gas) coupled to the vacuum chamber C to form the magnetic film. The magnetic pattern transfer method employed in the magnetic pattern transfer step (2) is substantially the same as in the first embodiment, and therefore not described in detail again.

After transfer of the magnetic pattern, as shown in the third step (3) of attaching a protective film, the protective film 1-3 is formed on the magnetic film 1-2 by the vacuum deposition method in the vacuum chamber C. Further, at the fourth step (4) of attaching a lubricant layer, the magnetic recording medium 1 is dipped in the vessel V filled with the liquid lubricant L thereby to form the lubricant layer 1-4 (not shown) on the protective film 1-3. In this way, the fabrication process of the magnetic recording medium 1 is completed.

Also in the second embodiment shown in FIG. 6, as in the first embodiment, the magnetic pattern is transferred onto the magnetic film of the magnetic recording medium before attaching the protective film and the lubricant layer. Therefore, the distance between the magnetic film of the magnetic recording medium and the magnetic portions of the magnetic pattern transfer master is shortened than in the prior art. Thus, the closeness between the magnetic recording medium and the magnetic pattern transfer master is increased, and the transfer of the magnetic pattern with high density is made possible.

The magnetic film is generally formed of a metal such as iron and therefore easily oxidized. Before the protective film is formed on the magnetic film as in the second embodiment shown in FIG. 6 (in particular, at the magnetic pattern transfer step (2)), therefore, the magnetic pattern is desirably transferred in the chamber C' filled with an inert gas to prevent the oxidization of the magnetic film. Further, after arranging the magnetic recording medium and the magnetic pattern transfer master in the chamber C' filled with the inert gas, the inert gas is withdrawn from the chamber C' into a vacuum state. In this way, the closeness between the magnetic recording medium and the magnetic pattern transfer master can be increased more than in the first embodiment shown in FIG. 5.

FIG. 7 is a flowchart for explaining the magnetic pattern transfer method according to a third embodiment of the present invention. Also in this case, the fabrication process of the magnetic recording medium 1 related to the magnetic pattern transfer method according to the present invention is shown in simplified fashion.

As shown in FIG. 7, according to the third embodiment of the present invention, at the first step (1) of forming a magnetic film, as in the prior art, the magnetic film 1-2 is formed (not shown) on the nonmagnetic medium base 1-1 by the vacuum deposition method in the vacuum chamber C. Next, as shown in the second step (2) of attaching a first protective film, after forming the magnetic film 1-2, a thin part of the protective film 1-3 (for example, a protective film one half as thick as the normal film, like the first protective film 1-3*a* in FIG. 7) is formed.

Further, as shown in the third step (3) of magnetic pattern transfer, the magnetic pattern is transferred to the magnetic film 1-2 of the magnetic recording medium 1 in the vacuum chamber C to form a magnetic film or in a vacuum environment coupled to the vacuum chamber C. The magnetic pattern transfer method in this magnetic pattern transfer step (3) is also substantially the same as in the first embodiment, and therefore not described in detail again. In the third embodiment, however, a thin part of the protective film 1-3 is formed on the magnetic film 1-2, and therefore the surface of the magnetic film 1-2 is prevented from being damaged at the time of transferring the magnetic pattern to the magnetic film 1-2 of the magnetic recording medium 1.

After transferring the magnetic pattern, as shown in the fourth step (4) of attaching a second protective film, the remaining part of the protective film 1-3 (like the second protective film 1-3*b* in FIG. 7) is formed on the first protective film 1-3*a* by the vacuum deposition method in the vacuum chamber C. Further, in the fifth step (5) of attaching a lubricant layer, the magnetic recording medium 1 is dipped in the vessel V filled with the liquid lubricant L thereby to form the lubricant layer 1-4 on the second protective film 1-3*b* (not shown). In this way, the fabrication process of the magnetic recording medium 1 is completed.

According to the third embodiment shown in FIG. 7, before attaching a part of the protective film and the lubricant layer, the magnetic pattern is transferred onto the magnetic film of the magnetic recording medium. Therefore, the distance between the magnetic film of the magnetic recording medium and the magnetic portions of the magnetic pattern transfer master is shortened than in the prior art, thereby increasing the closeness between the magnetic recording medium and the magnetic pattern transfer master.

The magnetic film is generally formed of a metal such as iron and therefore easily oxidized. In the embodiment shown in FIG. 7, before executing the magnetic pattern transfer step (3), a protective film as thin as not to affect the closeness between the magnetic recording medium and the magnetic pattern transfer master is formed on the magnetic film. In this way, the high closeness between the magnetic recording medium and the magnetic pattern transfer master is maintained. At the same time, the surface of the magnetic film is prevented from being damaged on the one hand and the oxidization of the magnetic film is avoided on the other hand.

FIG. 8 is a flowchart for explaining the magnetic pattern transfer method according to a fourth embodiment of the present invention. Also in this embodiment, the fabrication process of the magnetic recording medium 1 related to the magnetic pattern transfer method according to the present invention is shown in simplified fashion.

As shown in FIG. 8, according to the fourth embodiment of the invention, at the first step (1) of forming a magnetic film, as in the prior art, the magnetic film 1-2 is formed (not shown) on the nonmagnetic medium base 101 by the vacuum deposition method in the vacuum chamber C. Next, as shown in the second step (2) of attaching a first protective film, a thin part of the protective film 1-3 (a protective film one half as thick as the normal film, for example, like the first protective film 1-3*a* in FIG. 8) is formed after forming the magnetic film 1-2.

Further, as shown in the third step (3) of magnetic pattern transfer, the magnetic pattern is transferred to the magnetic film 1-2 of the magnetic recording medium 1 in an inert gas environment (the chamber C' filled with a liquefied inert gas, for example) coupled to the vacuum chamber C for forming a magnetic film. The magnetic pattern transfer method in the magnetic pattern transfer step (3) is also substantially the same as in the first embodiment described above, and therefore not described in detail any more. In the fourth embodiment, however, as in the third embodiment, a thin part of the protective film 1-3 is formed on the magnetic film 1-2. In transferring the magnetic pattern to the magnetic film 1-2 of the magnetic recording medium 1, therefore, the surface of the magnetic film 1-2 is prevented from being damaged.

After transferring the magnetic pattern, as shown in the fourth step (4) of attaching a second protective film, the remaining part of the protective film 1-3 (like the second protective film 1-3*b* in FIG. 7) is formed on the first protective film 1-3*a* by the vacuum deposition method in the vacuum chamber C. Further, at the fifth step (5) of attaching a lubricant layer, the magnetic recording medium 1 is dipped in the vessel V filled with a liquefied lubricant L, thereby forming the lubricant layer 1-4 on the protective film 1-3*b* (not shown). In this way, the entire film forming process of the magnetic recording medium 1 is completed.

According to the fourth embodiment shown in FIG. 8, the magnetic pattern is transferred to the magnetic film of the magnetic recording medium before attaching a part of the protective film and the lubricant layer. Therefore, the distance between the magnetic film of the magnetic recording medium and the magnetic portions of the magnetic pattern transfer master is shortened than in the prior art, thereby improving the closeness between the magnetic recording medium and the magnetic pattern transfer master.

The magnetic film is generally formed of a metal such as iron and therefore easily oxidized. In the embodiment shown in FIG. 8, before executing the magnetic pattern transfer step (3), a protective film as thin as not to affect the closeness between the magnetic recording medium and the magnetic pattern transfer master is formed on the magnetic film. In this way, the high closeness between the magnetic recording medium and the magnetic pattern transfer master is maintained. At the same time, the surface of the magnetic film is prevented from being damaged on the one hand and the oxidization of the magnetic film is avoided on the other hand. Further, after arranging the magnetic recording medium and the magnetic pattern transfer master in the chamber C' filled with the inert gas, the inert gas is withdrawn from the chamber C' into a vacuum state. In this way, the closeness between the magnetic recording medium and the magnetic pattern transfer master can be increased more than in the third embodiment shown in FIG. 7.

FIG. 9 is a flowchart for explaining the magnetic pattern transfer method according to a fifth embodiment of the present invention. Also in this case, the fabrication process of the magnetic recording medium 1 related to the magnetic pattern transfer method according to the present invention is shown in simplified fashion.

As shown in FIG. 9, according to the fifth embodiment of the present invention, in the first step (1) of forming a magnetic film, as in the prior art, the magnetic film 1-2 is formed on the nonmagnetic medium base 1-1 by the vacuum deposition method in the vacuum chamber C. Next, as shown in the second step (2) of forming a first protective film, the protective film 1-3 is formed after forming the magnetic film 1-2.

Further, as shown in the third step (3) of attaching a lubricant layer and magnetic pattern transfer, after forming the protective film 1-3, the magnetic recording medium 1 is dipped in the vessel V filled with the liquefied lubricant L thereby to form the lubricant layer 1-4. While the lubricant layer 1-4 is being formed, the magnetic pattern is transferred to the magnetic film 1-2 of the magnetic recording medium in the liquefied lubricant L in an environment coupled to the vacuum chamber C for forming a magnetic film. In view of the fact that the magnetic pattern is transferred in the liquid lubricant L while the lubricant layer 1-4 is being formed, the dust and dirt can be kept off from the surface of the magnetic recording medium 1 even outside the vacuum or the inert gas. The magnetic pattern transfer method in the magnetic pattern transfer step (3) and the lubricant attaching step is also substantially the same as in the first embodiment, and therefore not described in detail any more.

After transfer of this magnetic pattern, the lubricant layer 1-4 of the final thickness is formed on the protective film 1-3. In this way, the fabrication process of the magnetic recording medium 1 is completed (completed magnetic recording medium product (4)).

According to the fifth embodiment shown in FIG. 9, the magnetic pattern is transferred onto the magnetic film of the magnetic recording medium before the lubricant layer is completely formed on the magnetic film. Therefore, the distance between the magnetic film of the magnetic recording medium and the magnetic portions of the magnetic pattern transfer master is shortened for an increased closeness between the magnetic recording medium and the magnetic pattern transfer master than in the prior art.

In all the first to sixth embodiments, the distance between the magnetic film of the magnetic recording medium and the magnetic pattern of the magnetic pattern transfer master is shortened than in the prior art thereby to improve the closeness between the magnetic recording medium and the magnetic pattern of the magnetic pattern transfer master. Therefore, the magnetic field due to the leakage magnetic fluxes generated from the magnetic pattern of the magnetic pattern transfer master is comparatively strengthened. By utilizing this magnetic field, therefore, a magnetic pattern higher in density than in the prior art can be transferred with high accuracy to the magnetic recording medium. Further, in view of the fact that a high-density magnetic pattern is transferred using an ordinary magnetic pattern transfer master, the production cost of the magnetic disk device can be minimized.

FIG. 10 is a plan view showing an example of the magnetic pattern transfer master used in the conventional magnetic pattern transfer method. FIG. 11 is a schematic diagram for explaining the magnetic pattern transfer method according to a sixth embodiment of the present invention. In both FIGS. 10 to 11, however, the magnetic pattern transfer master used for transfer of the magnetic pattern is shown in partly enlarged form.

In this case, to facilitate the comparison with the magnetic pattern transfer method according to the sixth embodiment shown in FIG. 11, a magnetic pattern transfer master having a magnetic layer preformed with an uneven magnetic pattern is shown as an example of the magnetic pattern transfer master used for the conventional magnetic pattern transfer method.

With reference to portion (a) and portion (b) of FIG. 10, the process of fabricating the magnetic pattern transfer master 300 used for the conventional magnetic pattern transfer method is explained below. At first step, a magnetic layer 350 is formed on a nonmagnetic master base (i.e. master substrate) 500 by the vacuum deposition method. A negative resist RS is coated on the magnetic layer 350 and exposed. Then, a negative pattern is formed on the magnetic layer 350 of the magnetic pattern transfer master 300. (portion (a) of FIG. 10). At second step, the magnetic layer 350 with a negative pattern of the negative resist RS formed thereon is etched (portion (b) of FIG. 10).

By this etching process, an uneven magnetic pattern having pattern grooves G' and pattern protrusions P' is formed. The magnetic pattern of the magnetic layer 350 formed in this way is a reversed version of the negative pattern due to the negative resist RS.

In the conventional magnetic pattern transfer master 300 formed with the magnetic pattern shown in portion (b) of FIG. 10, each pattern protrusion (convex part of the pattern) P' and each pattern groove (concave part of the pattern) G' have substantially the same area. In the case in which the magnetic pattern is transferred onto the magnetic film of the magnetic recording medium, therefore, the area of the surface S' of the pattern protrusion P' in contact with the surface of the magnetic film is relatively decreased. Thus, the closeness between the magnetic recording medium and the magnetic pattern transfer master 300 is not so high.

In fabricating the magnetic pattern transfer master 3 used for the magnetic pattern transfer method according to the sixth embodiment of the present invention, on the other hand, as shown in FIG. 11, a magnetic layer 40 is formed on the nonmagnetic master base (i.e. the master substrate) 5 by vacuum deposition at the first step. The negative resist RS is coated on the magnetic layer 40 and exposed. Then, a negative pattern is formed on the magnetic layer 40 of the magnetic pattern transfer master 3 (portion (a) of FIG. 11). At the second step, the magnetic layer 40 is etched with the negative pattern due to the negative resist RS formed on the magnetic layer 40 (portion (b) of FIG. 11). The magnetic pattern of the magnetic layer 40 formed in this way is the reverse version of the negative pattern due to the negative resist RS. As described above, the fabrication process of the magnetic pattern transfer master 3 used in the magnetic pattern transfer method according to the sixth embodiment of the present invention is substantially the same as in the prior art.

In the magnetic pattern transfer master 3 formed with the magnetic pattern as shown in portion (b) of FIG. 11, however, the area of each pattern protrusion (convex part of the pattern) P is larger than the area of each pattern groove (concave part of the pattern) G. In the case where the magnetic pattern is transferred to the magnetic film of the magnetic recording medium in the sixth embodiment, therefore, the area of the surface S of the pattern protrusion P in contact with the surface of the magnetic film is relatively increased, so that the closeness between the magnetic recording medium and the magnetic pattern transfer master 3 is improved.

Further, according to the sixth embodiment described above, in order to form a magnetic pattern on the magnetic layer 40 of the magnetic pattern transfer master 3 as described above, the negative pattern due to the negative resist RS is formed on the magnetic layer 40. In this negative pattern, as shown in portion (a) of FIG. 11, the area of each protrusion of the resist RS is smaller than the area of the concave portion thereof. Generally, the resist pattern can be fabricated more easily in the case in which the area of one of the protrusion and the groove is smaller than the other than in the case in which the protrusion and the groove have the same area. For this reason, the resist pattern used in the sixth embodiment is advantageously more easily fabricated than the conventional resist pattern.

FIG. 12 is a schematic diagram showing an example of the magnetic pattern transferred by the conventional magnetic pattern transfer method. In this case, however, the magnetic pattern transfer master used for transfer of the magnetic pattern and the magnetic recording medium are partly shown in enlarged form. An explanation is given about a method of transferring the magnetic pattern to the magnetic film 1-2 of the magnetic recording medium 1 using the magnetic pattern transfer master 300 shown in FIG. 10.

The magnetic pattern transfer method shown in FIG. 12 is basically identical with the magnetic pattern transfer method shown in FIG. 4. In this case, however, to facilitate the comparison with the magnetic pattern transfer method according to the seventh to 13th embodiments of the present invention described later, the conventional magnetic pattern transfer method shown in FIG. 12 is explained in detail.

In FIG. 12, first of all, the magnetic pattern transfer master 300 including magnetic portions 400 (corresponding to the magnetic layer 350 in FIG. 10) preformed with an uneven magnetic pattern having the pattern grooves G' and the pattern protrusions P' is brought in proximity to the magnetic recording medium 1. Next, a permanent magnet (not shown) is arranged in such a manner as to cover the magnetic portions 400 of the magnetic pattern transfer master 300, and a predetermined magnetic field EF generated from the permanent magnet is applied to the magnetic pattern transfer master 300.

This externally applied magnetic field EF magnetizes each magnetic pattern of the magnetic portions 400 in the same direction as the applied magnetic field EF (i.e. the direction parallel to the surface of the magnetic recording medium 1 and the magnetic pattern transfer master 300) thereby to generate a magnetic field in each magnetic pattern. At the same time, leakage magnetic fluxes are generated in the pattern groove G' between each adjacent magnetic patterns. The magnetic field due to these leakage magnetic fluxes magnetizes the magnetic film 1-2 on the medium base 1-1 of the magnetic recording medium 1 in the same direction as the externally applied magnetic field EF. Thus, each magnetic pattern MP of a size substantially corresponding to the pattern groove G' of the magnetic pattern of the magnetic pattern transfer master 300 is transferred to the magnetic film 1-2 of the magnetic recording medium 1.

In the conventional magnetic pattern transfer master 300, as shown in FIG. 12, the size (width) of each pattern protrusion P' is substantially equal to the size (width) of the pattern groove G'. As described above, the recent increase in the capacity of the magnetic disk device has come to demand a magnetic pattern having a higher density of servo information. Thus, the size of each pattern protrusion P' and the pattern groove G1 of the magnetic pattern transferred to the magnetic recording medium are further decreased (for example, 50 nm ($5 \times 10^{-8}$ m) or less). As a result, the magnetic field due to the leakage magnetic fluxes generated in the pattern grooves G' of the magnetic pattern is weakened.

With the decrease in the size of the pattern protrusion P' of the magnetic pattern, on the other hand, the magnetic field supplied from the pattern protrusions P' to the pattern grooves G' is weakened, and therefore the magnetic field due to the leakage magnetic fluxes generated by the patter grooves G' is further weakened.

As a result, in the conventional magnetic pattern transfer method, it has become difficult to prepare a magnetic pattern transfer master of high resolution having the same size as the magnetic pattern transferred to the magnetic recording medium.

The magnetic pattern transfer method according to this invention, in contrast, uses a magnetic pattern transfer master in which the size (width) of each pattern groove of the magnetic pattern to be transferred is smaller than the size (width) of the corresponding pattern protrusion, and while the relative position of the magnetic pattern transfer master is displaced, the magnetic pattern is transferred to the magnetic film of the magnetic recording medium a plurality of times. Therefore, without using the magnetic pattern transfer master of high density, a magnetic pattern higher in resolution than the prior art and having the same size as the width of the pattern groove of the magnetic pattern transfer master can be transferred to the magnetic recording medium.

As described above, the magnetic recording medium 1 used for the magnetic pattern transfer is normally fabricated by forming the magnetic film 1-2 on the medium base 1-1 after which a protective film and a lubricant layer (none of which is shown) are formed on the magnetic film 1-2. In this case, unlike in the embodiments shown in FIGS. 5 to 9, the method of transferring the magnetic pattern to the magnetic film 1-2 of the magnetic recording medium 1 before forming the protective film or the lubricant layer during the fabrication of the magnetic recording medium 1 is not employed. Instead, it should be noted that while the relative position of the magnetic pattern transfer master 3 is displaced, the magnetic pattern is transferred to the magnetic film 1-2 of the magnetic recording medium 1 a plurality of times. In this way, a magnetic pattern of higher resolution than in the prior art can be transferred to the magnetic recording medium.

A magnetic pattern transferring method according to seventh to 13th embodiments of the present invention is described in detail below with reference to the accompanying drawings (FIGS. 13 to 17).

FIG. 13 is a schematic diagram for explaining a magnetic pattern transfer method according to a seventh embodiment of the present invention. In this case, however, the magnetic pattern transfer master used to transfer the magnetic pattern and the magnetic recording medium are partly shown in enlarged form.

The seventh embodiment shown in FIG. 13 uses a magnetic pattern transfer master 3 having magnetic portions 4 of which the size (width) of each pattern groove G of the magnetic pattern to be transferred is smaller than the size (width) of the pattern protrusion P. As a result, as explained in the sixth embodiment shown in FIG. 11, the magnetic pattern transfer master can be fabricated more easily than the conventional magnetic pattern transfer master 300 (FIG. 12) in which the size (width) of the pattern groove is substantially the same as the size (width) of the pattern protrusion.

In the first session of magnetic pattern transfer using the magnetic pattern transfer master fabricated in this manner, first of all, the magnetic pattern transfer master 3 is brought in proximity to the magnetic recording medium 1. Next, a permanent magnet (not shown) is arranged in such a manner as to cover the magnetic portions 4 of the magnetic pattern transfer master 3, and a predetermined magnetic field EF generated from this permanent magnet is applied to the magnetic pattern transfer master 3.

This externally applied magnetic field EF magnetizes each pattern protrusion P of the magnetic patterns of the magnetic portions 4 in the same direction as the applied magnetic field EF (i.e. the direction parallel to the surface of the magnetic pattern transfer master 3 and the magnetic recording medium 1) thereby to generate a magnetic field in the particular pattern protrusion P. Once this magnetic field in the pattern protrusion P is supplied to a pattern groove G, leakage magnetic fluxes are generated in the particular pattern groove G. The magnetic field due to the leakage magnetic fluxes magnetizes the magnetic film 1-2 on the medium base 1-1 of the magnetic recording medium 1 in the same direction as the externally applied magnetic field EF. Thus, each magnetic pattern MP of a size substantially corresponding to the pattern groove G of the particular magnetic pattern of the magnetic pattern transfer master 3 is transferred to the magnetic film 1-2 of the magnetic recording medium 1.

Further, according to the seventh embodiment shown in FIG. 13, the relative position of the magnetic pattern transfer master 3 is displaced, while transferring the magnetic pattern a plurality of times repeatedly. As a result, a magnetic pattern having a higher resolution than the conventional one and having the same size as the width of the pattern groove of the magnetic pattern transfer master can be transferred to the magnetic recording medium 1 using the magnetic pattern transfer master easier to fabricate than in the prior art.

The size (width) of each pattern protrusion P of the magnetic pattern of the magnetic pattern transfer master 3 used in this case is larger than the size (width) of the pattern groove G. Therefore, a comparatively strong magnetic field is supplied to the pattern groove G from the pattern protrusion P. As a result, the magnetic field due to the leakage magnetic fluxes generated in the pattern groove G is also comparatively strong, and a magnetic pattern of higher resolution than in the prior art can be easily transferred using this magnetic field.

FIG. 14 shows part 1 of a first specific example of the magnetic pattern transfer method according to the embodiment shown in FIG. 13, and FIG. 15 part 2 of the first specific example of the magnetic pattern transfer method according to the same embodiment. Also in this case, the magnetic pattern transfer master used to transfer the magnetic pattern and the magnetic recording medium are partly shown in enlarged form. Further, this first specific example assumes that the magnetic pattern is transferred twice while displacing the relative position of the magnetic pattern transfer master.

In the first specific example shown in FIGS. 14 and 15, first of all, a sufficiently large magnetic field is applied in a specified direction (for example, the direction opposite to the externally applied magnetic field EF) to the magnetic recording medium 1, so that the magnetic film 1-2 on the medium base 1-1 is initialized in its entirety (the portions IP initialized in FIG. 14).

Further, in the first session of magnetic pattern transfer using the magnetic pattern transfer master 3 of which the size of each pattern groove G of the magnetic pattern is smaller than the size of the pattern protrusion P, as shown in portion (a) of FIG. 14, the magnetic pattern transfer master 3 is brought in proximity to the magnetic recording medium 1. Further, a permanent magnet (not shown) is arranged in such a manner as to cover the magnetic portions 4 of the magnetic pattern transfer master 3, and a predetermined magnetic field EF generated from the permanent magnetic is applied to the magnetic pattern transfer master 3.

This externally applied magnetic field EF magnetizes the pattern protrusions P of the magnetic patterns of the magnetic portions 4 in the same direction as the applied magnetic field EF thereby to generate a magnetic field in the pattern protrusions P. This magnetic field in the pattern protrusions P generates leakage magnetic fluxes in the pattern grooves G. The magnetic field due to the leakage magnetic fluxes magnetizes the magnetic film 1-2 of the magnetic recording medium 1 in the same direction as the externally applied magnetic field EF. Thus, the magnetic patterns MP-1 each having the same size as the pattern groove G of the magnetic pattern are transferred to the magnetic film 1-2 of the magnetic recording medium 1.

Further, in the second session of magnetic pattern transfer, as shown in the second transfer session shown in portion (b) of FIG. 15, the position of the magnetic pattern transfer master 3 or the magnetic recording medium 1 is displaced while the magnetic field EF in the same direction is applied. This transfer of the magnetic pattern is repeated. As a result, the magnetic patterns MP-2 having the same size as in the first session of magnetic pattern transfer (i.e. the size of the pattern groove G of the magnetic pattern transfer master 3) are transferred to the magnetic film 1-2 of the magnetic recording medium 1 at a different position from the magnetic patterns MP-1 transferred in the first session of magnetic pattern transfer.

Finally, the magnetic patterns MP-1 and MP-2 transferred in the first and second magnetic pattern transfer sessions, respectively, each have the same size as the pattern groove G of the magnetic pattern transfer master 3 and are magnetized in the same direction (the direction along the applied magnetic field EF, for example). The first magnetic patterns MP-1 and the second magnetic patterns MP-2 adjacent to each other, on the other hand, are magnetized in opposite directions to the applied magnetic field EF due to the initialization. In this case, therefore, a magnetic pattern having a shorter pattern period than the magnetic pattern transfer master 3 is transferred to the magnetic film 1-2 of the magnetic recording medium 1.

In FIGS. 14 and 15, the magnetic patterns MP-1 transferred in the first transfer session are indicated by thin hatching, and the magnetic patterns MP-2 transferred in the second transfer session by thick hatching.

In the first specific example shown in FIGS. 14 and 15, the magnetic pattern transfer master including each pattern groove narrower than the size of the pattern protrusion is used, and the magnetic pattern is transferred repeatedly, while displacing one of the magnetic pattern transfer master and the magnetic recording medium. Without the magnetic pattern transfer master of high density, therefore, a magnetic pattern shorter in period and higher in resolution than in the prior art can be transferred to the magnetic recording medium.

FIG. 16 is a schematic diagram showing part one of a second specific example of the magnetic pattern transfer method according to the embodiment of FIG. 13; FIG. 17 is a schematic diagram showing part two of the second specific example of the magnetic pattern transfer method according to the same embodiment; and FIG. 18 is a schematic diagram showing part three of the second specific example of the magnetic pattern transfer method according to the same embodiment.

Also in this case, the magnetic pattern transfer master used to transfer the magnetic pattern and the magnetic recording medium are partly shown in enlarged form. Further, this specific example assumes that the magnetic pattern is transferred thrice while displacing the relative position of the magnetic pattern transfer master and changing the direction of the externally applied magnetic field alternately.

Figure 18:
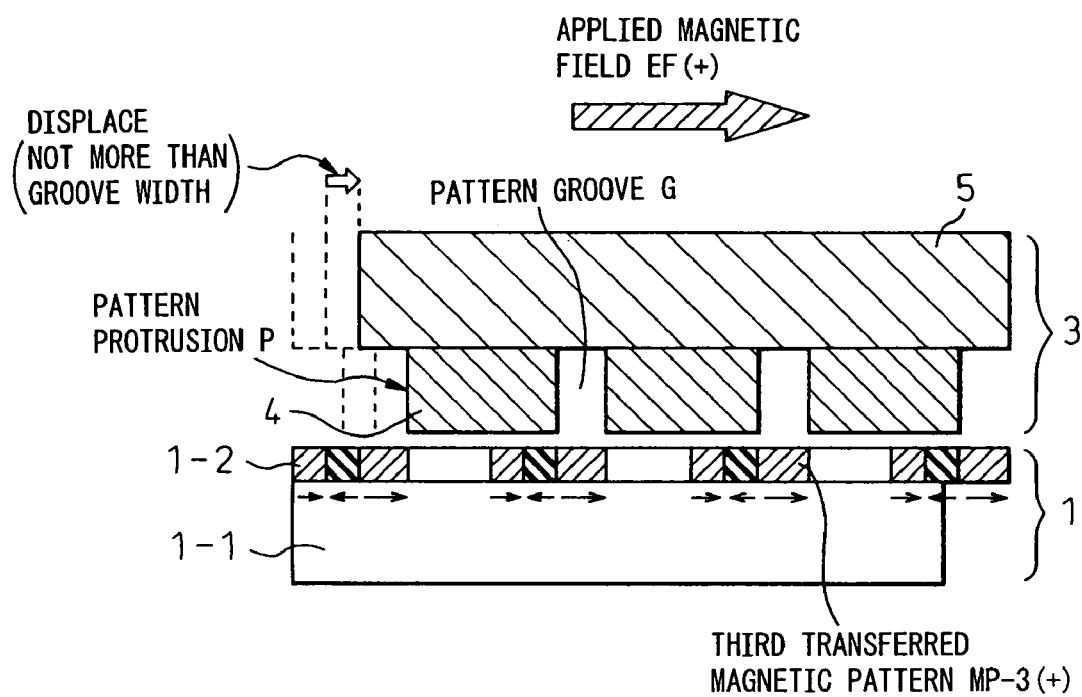
FIG. 18 is a third schematic diagram showing a second specific example of the magnetic pattern transfer method according to the embodiment of FIG. 13.

In the second specific example shown in FIGS. 16 to 18, first of all, a comparatively large magnetic field is applied in a specified direction to the magnetic recording medium 1, so that the magnetic film 1-2 on the medium base 1-1 is initialized in its entirety.

Further, in the the first session of magnetic pattern transfer using the magnetic pattern transfer master 3 of which the size of each pattern groove G of the magnetic pattern is smaller than the size of the pattern protrusion P, as shown in portion (a) of FIG. 16, the magnetic pattern transfer master 3 is brought in proximity to the magnetic recording medium 1. Further, a permanent magnet (not shown) is arranged in such a manner as to cover the magnetic portions 4 of the magnetic pattern transfer master 3, and a predetermined applied magnetic field EF (+) generated from the permanent magnet is applied to the magnetic pattern transfer master 3 in a preset direction (say, the direction indicated by arrow in FIG. 16).

This externally applied magnetic field EF (+) magnetizes each pattern protrusion P of the magnetic pattern of the magnetic portions 4 in the same direction as the applied magnetic field EF (+) thereby to generate a magnetic field in the pattern protrusion P. This magnetic field in the pattern protrusion P generates leakage magnetic fluxes in the corresponding pattern groove G. The magnetic field due to the leakage magnetic fluxes magnetizes the magnetic film 1-2 of the magnetic recording medium 1 in the same direction as the externally applied magnetic field EF (+). Thus, the magnetic patterns MP-1 (+) each having the same size as the pattern groove G of the magnetic pattern are transferred to the magnetic film 1-2 of the magnetic recording medium 1.

In the second session of magnetic pattern transfer, as shown in portion (b) of FIG. 17, the position of one of the magnetic pattern transfer master 3 and the magnetic recording medium 1 is displaced by the length not more than the width of the pattern groove G. At the same time, the direction of the externally applied magnetic field is changed, and the magnetic field EF (−) opposite to the applied magnetic field (+) for the first magnetic pattern transfer session is applied. In this way, the transfer of the magnetic pattern is repeated.

As a result, the magnetic film 1-2 of the magnetic recording medium 1 is magnetized in the same direction as the externally applied voltage EF (−) (i.e. in the opposite direction to the applied magnetic field (+)), and the magnetic patterns MP-2 (−) are transferred to the magnetic film 1-2 of the magnetic recording medium 1. In this case, the direction of magnetization of the magnetic patterns MP-2 (−) for the second magnetic pattern transfer session is opposite to that of the magnetic patterns MP-1 (+) for the first magnetic pattern transfer session. Therefore, the magnetic patterns MP-2 (−) for the second magnetic pattern transfer session are overwritten on a part of the magnetic patterns MP-1 (+) for the first magnetic pattern transfer session. As a result, a magnetic pattern of a size smaller than the pattern groove G of the magnetic pattern of the magnetic pattern transfer master is transferred to the magnetic film 1-2 of the magnetic recording medium 1.

Further, in the third session of magnetic pattern transfer, as shown in portion (c) of FIG. 18, the position of the magnetic pattern transfer master 3 or the magnetic recording medium 1 is displaced by the length not more than the width of the pattern groove G. At the same time, the direction of the externally applied magnetic field is changed, and the magnetic field EF (+) (i.e. the applied magnetic field for the first magnetic pattern transfer session) opposite to the applied magnetic field (−) for the second magnetic pattern transfer session is applied. In this way, the transfer of the magnetic pattern described above is repeated.

As a result, the magnetic film 1-2 of the magnetic recording medium 1 is magnetized in the same direction as the externally applied voltage EF (+), and the magnetic patterns MP-3 (+) are transferred to the magnetic film 1-2 of the magnetic recording medium 1. In this case, the direction of magnetization of the magnetic patterns MP-3 (+) for the third magnetic pattern transfer session is opposite to that of the magnetic patterns MP-2 (−) for the second magnetic pattern transfer session. Therefore, the magnetic patterns MP-3 (+) for the third magnetic pattern transfer session are overwritten on a part of the magnetic patterns MP-2 (−) for the second magnetic pattern transfer session.

As shown in FIG. 18, the final magnetic pattern transferred in the first to third magnetic pattern transfer sessions is smaller in size than the pattern groove G of the magnetic pattern transfer master 3 and shorter in period than the magnetic pattern of the first specific example shown in FIGS. 14 and 15. In FIGS. 16 to 18, the magnetic patterns MP-1 (+) and MP-3 (+) transferred in the first and third transfer sessions, respectively, are indicated by thin hatching, while the magnetic patterns MP-2 (−) transferred in the second transfer session are indicated by thick hatching in a different direction from the magnetic patterns MP-1 (+) and MP-3 (+).

In the specific example shown in FIGS. 16 to 18, the relative position of one of the magnetic pattern transfer master and the magnetic recording medium is displaced by the length not more than the width of the pattern groove G. At the same time, the direction of the externally applied magnetic field is changed alternately thereby to overwrite a part of the magnetic patterns while transferring the magnetic patterns. Without using the magnetic pattern transfer master of very high density, therefore, a magnetic pattern shorter in pattern period and higher in resolution than the first specific example shown in FIGS. 14 and 15 can be transferred to the magnetic recording medium.

Figure 19:
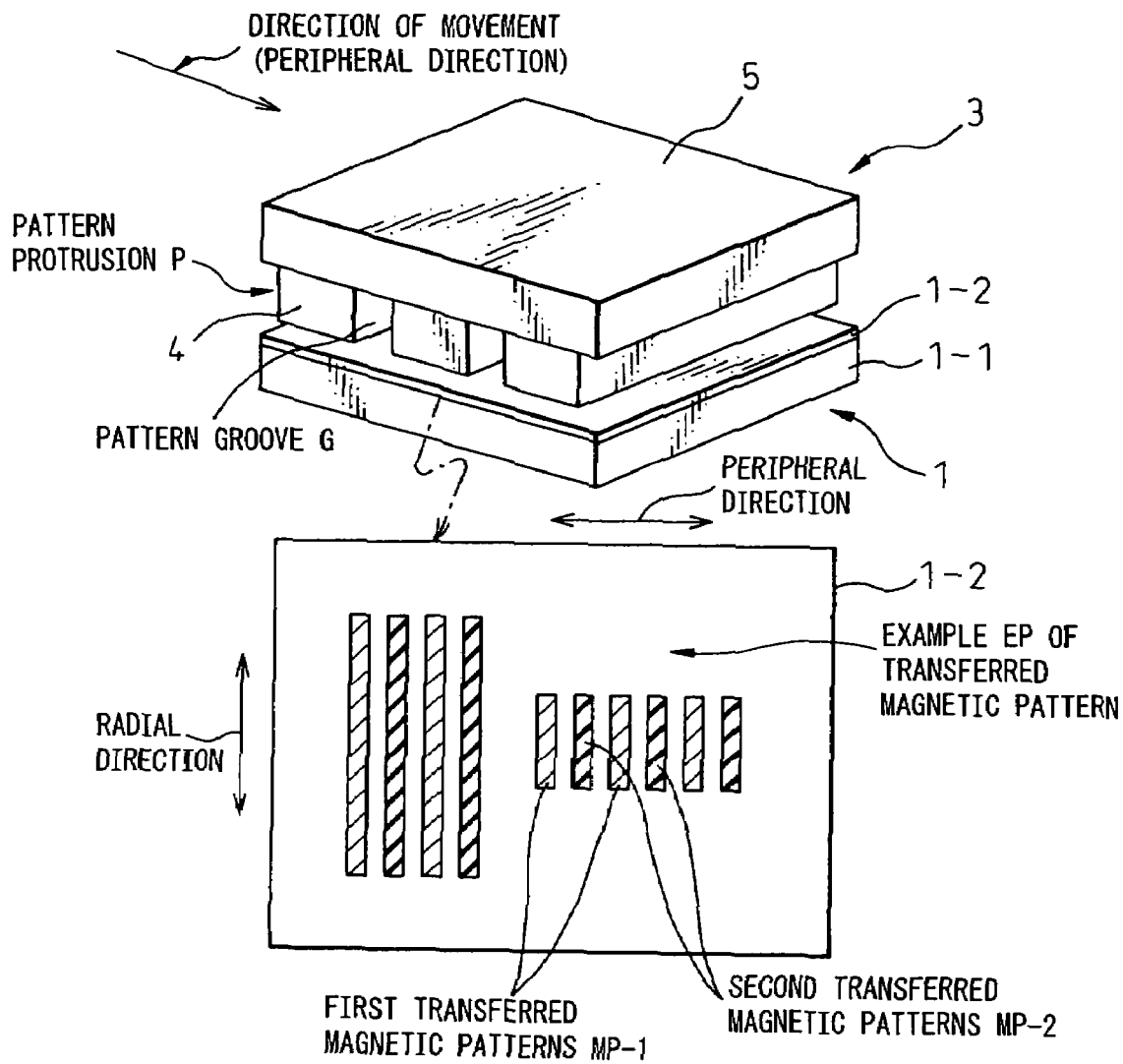
FIG. 19 is a first schematic diagram showing a third specific example of the magnetic pattern transfer method according to the embodiment of FIG. 13.
Figure 20:
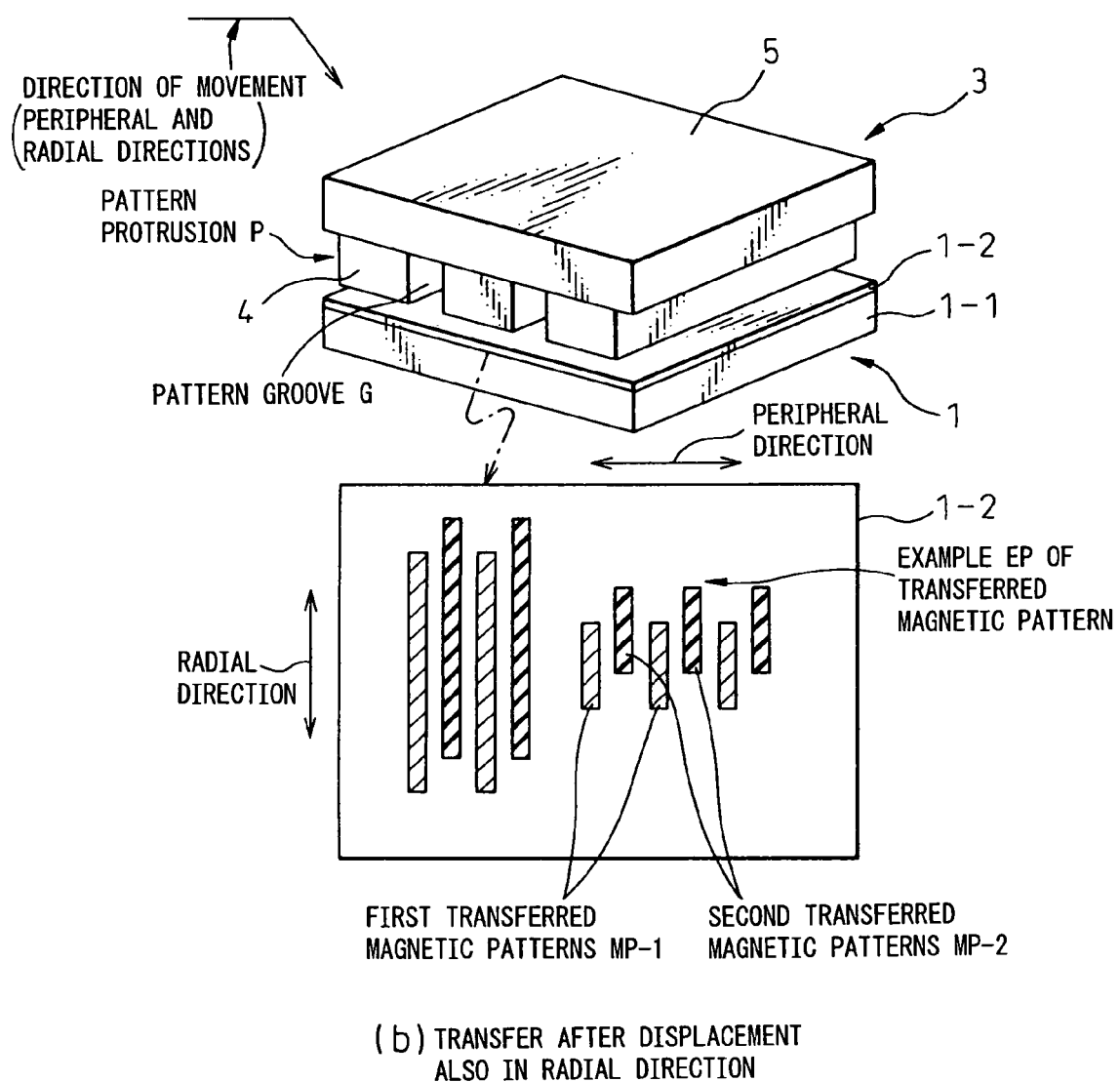
FIG. 20 is a second schematic diagram showing a third specific example of the magnetic pattern transfer method according to the embodiment of FIG. 13.

FIG. 19 is a schematic diagram showing part one of a third specific example of the magnetic pattern transfer method according to the embodiment shown in FIG. 13, and FIG. 20 a schematic diagram showing part two of the third specific example of the magnetic pattern transfer method according to the same embodiment.

Also in this case, the magnetic pattern transfer master used to transfer the magnetic patterns and the magnetic recording medium are partly shown in enlarged form. Further, this case assumes that the magnetic patterns are continuously transferred in peripheral or radial direction to a plurality of tracks (FIG. 1) arranged concentrically from the inner to the outer diameter on the magnetic film 1-2 of the magnetic recording medium 1 such as the magnetic disk used for an ordinary magnetic disk device.

In the third specific example shown in FIGS. 19 and 20, first of all, a sufficiently large magnetic field is applied in a specified direction to a plurality of the tracks of the magnetic recording medium 1, so that all the portions of the magnetic film 1-2 of the medium base 1-1 of each track are initialized.

Further, in the first magnetic pattern transfer session conducted for each several ones of the plurality of the tracks using the magnetic pattern transfer master 3 with each pattern groove narrower than the size of pattern protrusion P, as shown in FIG. 19, the magnetic pattern transfer master 3 is brought in proximity to the magnetic film 1-2 of several tracks of the magnetic recording medium 1. Further, a permanent magnet (not shown) is arranged in such a manner as to cover the magnetic portions 4 of the magnetic pattern transfer master 3, and a predetermined magnetic field generated from this permanent magnet is applied to the magnetic pattern transfer master 3.

This externally applied magnetic field magnetizes the pattern protrusions P of the magnetic pattern of the magnetic portions 4 in the same direction as the applied magnetic field (e.g. the direction tangential to each track) thereby to generate a magnetic field in the pattern protrusions P. This magnetic field in the pattern protrusions P generates leakage magnetic fluxes in the pattern grooves G. The magnetic field due to the leakage magnetic fluxes magnetizes the magnetic film 1-2 of several tracks of the magnetic recording medium 1 in the same direction as the externally applied magnetic field. Thus, the magnetic patterns MP-1 each having the same size as the pattern groove G of the magnetic pattern of the magnetic pattern transfer master 3 are transferred to several tracks of the magnetic film 1-2 of the magnetic recording medium 1, as shown in FIG. 19.

Further, in the second session of magnetic pattern transfer to several tracks described above, especially as shown in the lower half portion (a) (transferred by being displaced only along peripheral direction) of FIG. 19, the position of the magnetic pattern transfer master 3 or the magnetic recording medium 1 is displaced along the peripheral direction of the magnetic recording medium 1 while applying a magnetic field along the tangential direction of each track. This transfer of the magnetic pattern is repeated. As a result, the magnetic patterns MP-2 each having the same size as in the first magnetic pattern transfer session (i.e. the size of the pattern groove G of the magnetic pattern transfer master 3) are transferred to the magnetic film 1-2 of several tracks of the magnetic recording medium 1 at a different position from the magnetic patterns MP-1 transferred in the first magnetic pattern transfer session along the peripheral direction of the magnetic recording medium 1.

In FIG. 19, as an example EP of the transferred magnetic patterns, the magnetic patterns MP-1 of several tracks transferred in the first transfer session are indicated by thin hatching, while the magnetic patterns of several tracks transferred in the second transfer session are indicated by thick hatching.

Further, in the first session of magnetic pattern transfer to several ones of a plurality of the tracks using the magnetic pattern transfer master 3, the magnetic pattern transfer master 3 is brought in proximity to the magnetic film 1-2 of other several tracks of the magnetic recording medium 1. Furthermore, a permanent magnet is arranged in such a manner as to cover the magnetic portions 4 of the magnetic pattern transfer master 3, and a predetermined magnetic field generated from this permanent magnet is applied to the magnetic pattern transfer master 3.

By this externally applied magnetic field, as in the case of first magnetic pattern transfer session of several tracks, the magnetic patterns MP-1 each having the same size as the pattern groove G of the magnetic pattern of the magnetic pattern transfer master 3 are transferred to the magnetic film 1-2 of other several tracks of the magnetic recording medium 1.

In the second session of magnetic pattern transfer to other several tracks described above, as in the aforementioned second session of magnetic pattern transfer to the several tracks, one of the magnetic pattern transfer master 3 and the magnetic recording medium 1 is displaced along the peripheral direction of the magnetic recording medium 1 while applying a magnetic field along the tangential direction of each track. This magnetic pattern transfer is repeated. As a result, the magnetic patterns MP-2 each having the same size as in the first magnetic pattern transfer session are transferred to the magnetic film 1-2 of other several tracks of the magnetic recording medium 1 at a different position from the magnetic patterns MP-1 transferred in the first magnetic pattern transfer session.

As described above, in the third specific example shown in FIG. 19, the magnetic pattern transfer master 3 is sequentially moved so that the first and second magnetic pattern transfer sessions are conducted, several tracks at a time, over a plurality of the tracks. In this way, the magnetic patterns can be transferred continuously to all the tracks arranged along the peripheral direction of the magnetic recording medium 1.

On the other hand, as shown in the third specific example of FIG. 20, assume that the first session of magnetic pattern transfer to each several ones of a plurality of tracks is conducted using a magnetic pattern transfer master 3 of the same type as the one shown in FIG. 19. As in the case of FIG. 19 described above, the magnetic pattern transfer master 3 is brought in proximity to the magnetic film 1-2 of several tracks of the magnetic recording medium 1. Further, a permanent magnet is arranged in such a manner as to cover the magnetic portions 4 of the magnetic pattern transfer master 3, and a predetermined magnetic field generated from this permanent magnet is applied to the magnetic pattern transfer master 3.

This externally applied magnetic field magnetizes the pattern protrusions P of the magnetic patterns of the magnetic portions 4 in the same direction as the applied magnetic field (along the tangential direction of each track, for example) thereby to generate a magnetic field in the pattern protrusions P. This magnetic field in the pattern protrusions P generates leakage magnetic fluxes in the pattern grooves G. The magnetic field due to the leakage magnetic fluxes magnetizes the magnetic film 1-2 of several tracks of the magnetic recording medium 1 in the same direction as the externally applied magnetic field. As a result, as shown in FIG. 20, the magnetic patterns MP-1 each having the same size as the pattern groove G of the magnetic pattern of the magnetic pattern transfer master 3 are transferred to the magnetic film 1-2 of several tracks of the magnetic recording medium 1.

Further, in the second session of magnetic pattern transfer to several tracks described above, especially as shown in the lower half portion (a) (transferred by being displaced also along radial direction) of FIG. 20, the position of one of the magnetic pattern transfer master 3 and the magnetic recording medium 1 is displaced along the peripheral direction and the radial direction of the magnetic recording medium 1 while applying a magnetic field along the tangential direction of each track. This transfer of the magnetic pattern is repeated. As a result, the magnetic patterns MP-2 each having the same size as in the first magnetic pattern transfer session (i.e. the size of the pattern groove G of the magnetic pattern transfer master 3) is transferred to the magnetic film 1-2 of several tracks of the magnetic recording medium 1 at a position displaced in radial direction as well as peripheral direction of the magnetic patterns MP-1 transferred in the first magnetic pattern transfer session.

In FIG. 20, as in the case of FIG. 19, as an example EP of the transferred magnetic pattern, the magnetic patterns MP-1 of several tracks transferred in the first transfer session are indicated by thin hatching, while the magnetic patterns MP-2 of several tracks transferred in the second transfer session are indicated by thick hatching.

Further, in the case in which the magnetic pattern is transferred to other several ones of a plurality of the tracks in the first transfer session using the magnetic pattern transfer master 3, as in the case of FIG. 19 described above, the magnetic pattern transfer master 3 is moved in proximity to the magnetic film 1-2 of other several tracks of the magnetic recording medium 1. Furthermore, a permanent magnet is arranged in such a manner as to cover the magnetic portions 4 of the magnetic pattern transfer master 3, and a predetermined magnetic field generated from this permanent magnet is applied to the magnetic pattern transfer master 3.

By this externally applied magnetic field, as in the case of the first magnetic pattern transfer session of several tracks described above, the magnetic patterns MP-1 each having the same size as the pattern groove G of the magnetic pattern of the magnetic pattern transfer master 3 are transferred to the magnetic film 1-2 of other several tracks of the magnetic recording medium 1.

Further, in the second session of magnetic pattern transfer to other several tracks as described above, as in the second session of magnetic pattern transfer to several tracks, the position of the magnetic pattern transfer master 3 or the magnetic recording medium 1 is displaced along the peripheral direction and the radial direction of the magnetic recording medium 1, while at the same time applying a magnetic field along the tangential direction of each track. This transfer of the magnetic pattern is repeated. As a result, the magnetic patterns MP-2 each having the same size as in the first magnetic pattern transfer session are transferred to the magnetic film 1-2 of several other tracks of the magnetic recording medium 1 at a position displaced in radial direction as well as peripheral direction of the magnetic patterns MP-1 transferred in the first magnetic pattern transfer session.

As described above, in the third specific example shown in FIG. 20, the magnetic pattern transfer master 3 is sequentially moved and the first and second magnetic pattern transfer sessions are conducted for each several ones of a plurality of the tracks. In this way, the magnetic patterns can be transferred continuously to all the tracks arranged at a position displaced both peripherally and radially of the magnetic recording medium 1.

In the third specific example shown in FIGS. 19 and 20, the magnetic pattern transfer master or the magnetic recording medium is displaced in at least selected one of peripheral and radial directions of the magnetic recording medium using the magnetic pattern transfer master with each pattern groove narrower than the size of the pattern protrusion. This magnetic pattern transfer session is repeated. Therefore, a magnetic pattern having a comparatively complicated shape and a high resolution which may be formed over several tracks can be efficiently transferred to the magnetic recording medium.

Figure 21:
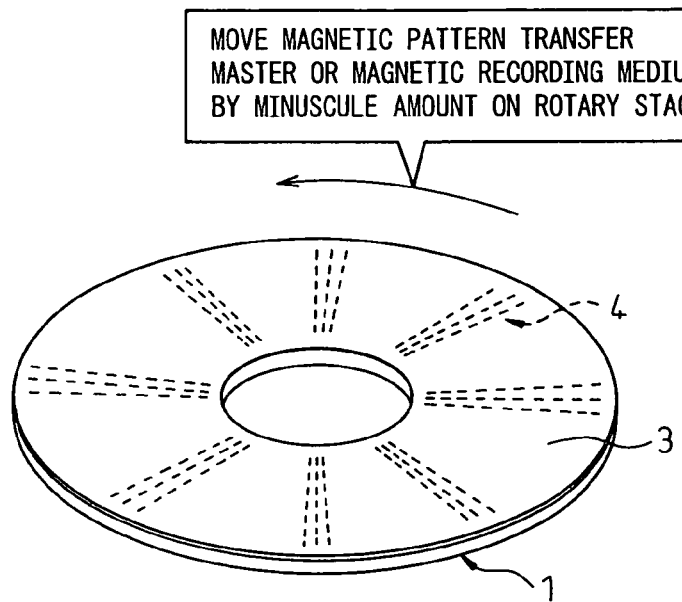
FIG. 21 is a schematic diagram for explaining the magnetic pattern transfer method according to an eighth embodiment of the present invention.

FIG. 21 is a schematic diagram for explaining a magnetic pattern transfer method according to an eighth embodiment of the present invention. In this diagram, however, the whole of the magnetic pattern transfer master used to transfer a magnetic pattern and the magnetic recording medium are shown in simplified fashion.

As explained with reference to FIG. 20, for example, the position of the magnetic pattern transfer master or the magnetic recording medium is displaced along the peripheral direction and the radial direction of the magnetic recording medium 1, while the magnetic pattern is transferred repeatedly a plurality of times. In order to transfer a magnetic pattern of high resolution to the magnetic recording medium 1, the amount of displacement from the reference position of the magnetic film 1-1 with respect to the magnetic portions 4 of the magnetic pattern transfer master 3 is required to be accurately set.

For this purpose, according to the eighth embodiment shown in FIG. 21, the magnetic pattern transfer master 3 and the magnetic recording medium 1 are mounted on a rotary stage (not shown), which is used to rotate the magnetic pattern transfer master 3 or the magnetic recording medium 1 by a minuscule amount in a specified direction (the direction indicated by arrow, for example). As a result, the amount of displacement of the magnetic film 1-1 from a reference position with respect to the magnetic portions 4 of the magnetic pattern transfer master 3 can be accurately set on the order of nm ($10^{-9}$ m), for example.

Figure 22:
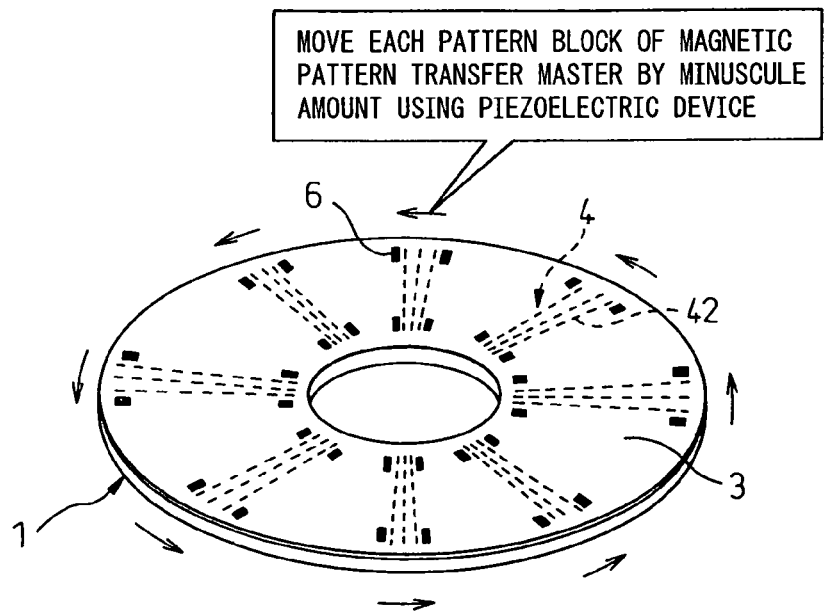
FIG. 22 is a schematic diagram for explaining the magnetic pattern transfer method according to a ninth embodiment of the present invention.

FIG. 22 is a schematic diagram for explaining a magnetic pattern transfer method according to a ninth embodiment of the present invention. Also in this case, the whole of the magnetic pattern transfer master used for magnetic pattern transfer and the magnetic recording medium are shown in simplified fashion.

In this embodiment, like in the eighth embodiment described above, the position of the magnetic pattern transfer master or the magnetic recording medium is displaced along the peripheral direction and the radial direction of the magnetic recording medium 1, while the magnetic pattern is transferred repeatedly a plurality of times. In order to transfer a magnetic pattern of high resolution to the magnetic recording medium 1, the amount of displacement of the magnetic film 1-1 from the reference position with respect to the magnetic portions 4 of the magnetic pattern transfer master 3 is required to be accurately set.

For this purpose, according to the ninth embodiment shown in FIG. 22, a piezoelectric device 6 is preformed in the neighborhood of each of a plurality of pattern blocks 42 making up a magnetic pattern of a magnetic pattern transfer master 3, and a predetermined voltage is kept applied between a first terminal and a second terminal of the piezoelectric device 6. In response to the change in the magnetic field received from a magnetic pattern block 4 of the magnetic pattern transfer master 3, the terminal voltage across the piezoelectric device 6 changes. This voltage change extends or contracts the piezoelectric device 6 and changes the size thereof. Taking advantage of the change in size of the piezoelectric device 6, the magnetic pattern transfer master 3 is rotated by a minuscule amount each time in a specified direction (in the direction indicated by arrows, for example).

Using this piezoelectric device, the amount of displacement of the magnetic film 1-1 from a reference position with respect of the magnetic portions 4 of the magnetic pattern transfer master 3 can be accurately set on the order of, say, nm ($10^{-9}$ m).

Figure 23:
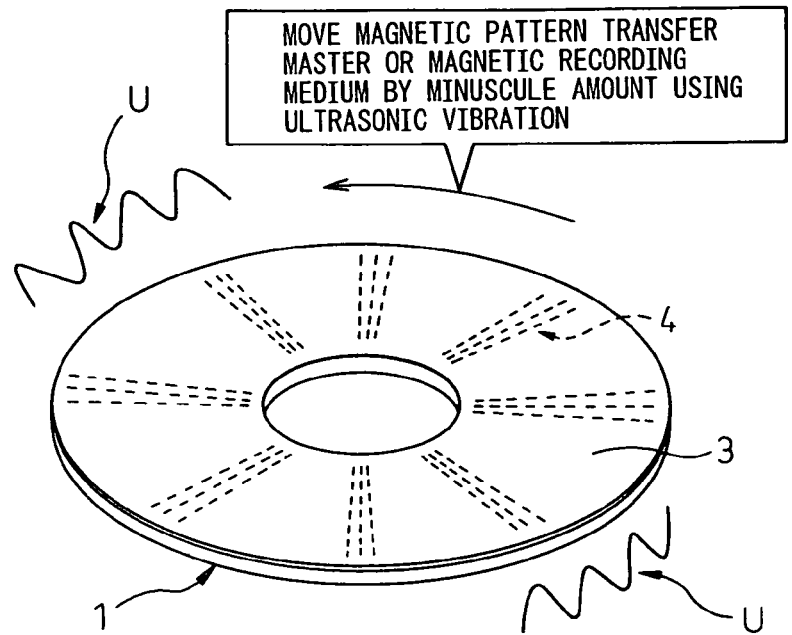
FIG. 23 is a schematic diagram for explaining the magnetic pattern transfer method according to a tenth embodiment of the present invention.

FIG. 23 is a schematic diagram for explaining a magnetic pattern transfer method according to a tenth embodiment of the present invention. Also in this case, the whole of the magnetic pattern transfer master used for magnetic pattern transfer and the magnetic recording medium are shown in simplified fashion.

In this embodiment, as in the eighth and ninth embodiments described above, the position of the magnetic pattern transfer master 3 or the magnetic recording medium 1 is displaced along the peripheral direction and the radial direction of the magnetic recording medium 1, while the magnetic pattern is transferred repeatedly a plurality of times. In order to transfer a magnetic pattern of high resolution to the magnetic recording medium 1, the amount of displacement of the magnetic film 1-1 from the reference position with respect to the magnetic portions 4 of the magnetic pattern transfer master 3 is required to be accurately set.

For this purpose, according to the tenth embodiment shown in FIG. 23, the ultrasonic vibration U of a ultrasonic vibrator is used to rotate the magnetic pattern transfer master 3 or the magnetic recording medium 1 by a minuscule amount at a time. Preferably, the ultrasonic vibrator adapted to vibrate in response to a ultrasonic wave is embedded in the magnetic pattern transfer master 3 or the magnetic recording medium 1, and the ultrasonic wave is supplied from an external supersonic motor to vibrate the ultrasonic vibrator. In this way, the magnetic pattern transfer master 3 or the magnetic recording medium 1, as the case may be, is rotated by a minuscule amount at a time.

The ultrasonic vibration of the supersonic vibrator makes it possible to set, with high accuracy, the amount of displacement of the magnetic film 1-1 from a reference position with respect to the magnetic portions 4 of the magnetic pattern transfer master 3 on the order of, say, nm ($10^{-9}$ m).

Figure 24:
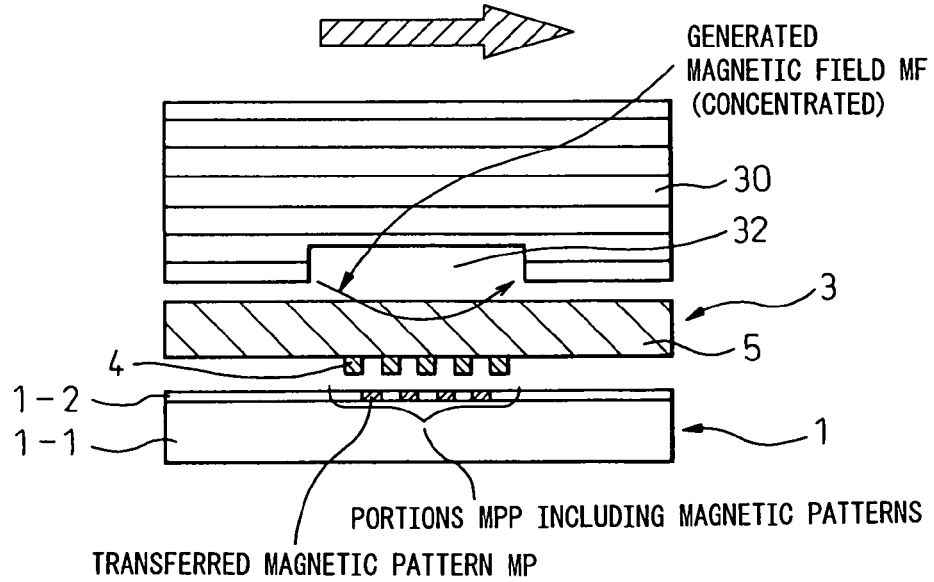
FIG. 24 is a schematic diagram for explaining the magnetic pattern transfer method according to an 11th embodiment of the present invention.

FIG. 24 is a schematic diagram for explaining a magnetic pattern transfer method according to an 11th embodiment of the present invention. In this diagram, the magnetic pattern transfer master, the auxiliary master and the magnetic recording medium used for magnetic pattern transfer are partly shown in enlarged form.

According to the 11th embodiment shown in FIG. 24, an auxiliary master 30 preformed with a groove 32 is laid over the magnetic pattern transfer master 3 used for magnetic pattern transfer. This auxiliary master 30 is arranged in such a position as to cover the pattern block making up the magnetic pattern preformed on the magnetic portions 4 of the magnetic pattern transfer master 3.

With the auxiliary master 30 thus arranged, the magnetic pattern transfer master 3 is brought in proximity to the magnetic recording medium 1. Further, a permanent magnet (not shown) is arranged in such a manner as to cover the magnetic pattern transfer master 3 and the auxiliary master 30, and the magnetic field EF generated from the permanent magnet is applied to the magnetic pattern transfer master 3 and the auxiliary master 30.

This externally applied magnetic field EF generates a magnetic field (corresponding to the magnetic field MF generated in FIG. 24) concentrated in the groove of the auxiliary master 30. In other words, a magnetic field is applied in a manner concentrated on the pattern block of the magnetic pattern of the magnetic pattern transfer master 3 through the groove of the auxiliary master 30.

As a result, according to the 11th embodiment shown in FIG. 24, in the case in which the magnetic pattern is transferred to the magnetic film 1-2 of the magnetic recording medium 1, the external magnetic field EF can be efficiently applied to the pattern block of the magnetic pattern through the groove of the auxiliary master 30. Thus, the portion MPP including the magnetic patterns of the magnetic film 1-2 of the magnetic recording medium 1 is efficiently supplied with the applied magnetic field EF from an external source. Even in the case in which the externally applied magnetic field EF is not so strong, therefore, a magnetic pattern MP of high resolution can be transferred to the magnetic recording medium 1.

FIG. 25 is a first schematic diagram for explaining a magnetic pattern transfer method according to a 12th embodiment of the present invention, and FIG. 26 a second schematic diagram for explaining the magnetic pattern transfer method according to the same embodiment. Also in this case, the magnetic pattern transfer master used for magnetic pattern transfer and the vertical magnetic recording medium are shown partly in exaggerated form. Further, it is assumed that the magnetic pattern is transferred twice while displacing the relative position of the magnetic pattern transfer master 3.

In the embodiments described above, a horizontal magnetic recording medium for horizontal magnetic recording (normally simply called the magnetic recording medium) is used as a magnetic recording medium as an object of magnetic pattern transfer. In the 12th embodiment shown in FIGS. 25, 26, however, a method of transferring the magnetic pattern to a vertical magnetic recording medium 1a for vertical magnetic recording is explained.

In the 12th embodiment shown in FIGS. 25, 26, the vertical magnetic recording medium 1a to which the magnetic pattern is to be transferred, as in the horizontal magnetic recording medium described above, is fabricated by forming a magnetic film 1-2a on a nonmagnetic medium base 1-1a and then forming a protective film and a lubricant layer (none of which are shown) on the magnetic film 1-2a.

According to the 12th embodiment, a sufficiently large magnetic field is applied in a specified direction (for example, the direction perpendicular to the surface of the magnetic film 1-2a) to the vertical magnetic recording medium 1a thus fabricated, and all the portions of the magnetic film 1-2a on the medium base 1-1a are initialized.

Further, in the first magnetic pattern transfer session using a magnetic pattern transfer master 3a in which each pattern protrusion Pa of the magnetic pattern is narrower than the pattern groove Gb, as shown in (a) of FIG. 25, the magnetic pattern transfer master 3a is brought in proximity to the vertical magnetic recording medium 1a. Furthermore, a permanent magnet (not shown) is arranged to supply a predetermined magnetic field in the direction perpendicular to the surface of the magnetic portions 4a of the magnetic pattern transfer master 3a and the surface of the magnetic film 1-2a of the vertical magnetic recording medium 1a, and a predetermined magnetic field EF generated from the permanent magnet is applied to the magnetic pattern transfer master 3a.

The externally applied magnetic field EF magnetizes the pattern protrusion Pa of the magnetic patterns of the magnetic portions 4a in the same direction as the applied magnetic field EF (i.e. the direction perpendicular to the surfaces of the magnetic pattern transfer master 3a and the vertical magnetic recording medium 1a). The magnetic field from the pattern protrusions Pa thus magnetized in turn magnetizes the magnetic film 1-2a of the vertical magnetic recording medium 1a in the same direction as the externally applied magnetic field EF, so that the magnetic patterns MPa-1 each having the same size as the pattern protrusion Pa of the magnetic pattern of the magnetic pattern transfer master 3 are transferred to the magnetic film 1-2a of the vertical magnetic recording medium 1a.

In this case, the magnetic pattern of each pattern protrusion Pa of the magnetic portions 4a is transferred to the magnetic film 1-2a of the vertical magnetic recording medium 1a. The direction of magnetization of the magnetic patterns MPa-1 transferred to the magnetic film 1-2a of the vertical magnetic recording medium 1a, therefore, is perpendicular to the surface of the magnetic film 1-2a of the vertical magnetic recording medium 1a.

Further, in the second magnetic transfer session, as shown in (b) shown in FIG. 26, the position of the magnetic pattern transfer master 3a or the vertical magnetic recording medium 1a is displaced while applying the magnetic field EF in the same direction. This transfer of the magnetic pattern is repeated. As a result, the magnetic patterns MPa-2 having the same size as in the first magnetic pattern transfer session (i.e. the size of the pattern protrusion Pa of the magnetic pattern transfer master 3a) are transferred to the magnetic film 1-2a of the vertical magnetic recording medium 1a at a different position than the magnetic patterns MPa-1 transferred in the first magnetic pattern transfer session.

Finally, the magnetic patterns MPa-1 and MPa-2 transferred in the first and second magnetic pattern transfer sessions, respectively, each have the same size of the pattern protrusion of the magnetic pattern transfer master 3a and are magnetized in the same direction (for example, the direction of the applied magnetic field EF). Between the first magnetic patterns MPa-1 and the second magnetic patterns MPa-2 adjacent to each other, on the other hand, a magnetic pattern magnetized in the opposite direction to the applied magnetic field EF is formed by initialization. In this case, therefore, a magnetic pattern having a shorter pattern period than the magnetic pattern transfer master 3a is transferred to the magnetic film 1-2a of the vertical magnetic recording medium 1a.

In FIGS. 25 and 26, the magnetic patterns MPa-1 transferred in the first magnetic pattern transfer session are indicated by thin hatching, and the magnetic patterns MPa-2 transferred in the second magnetic pattern transfer session by thick hatching.

The embodiment shown in FIGS. 25, 26 uses the magnetic pattern transfer master 3a having the magnetic portions 4a in which the size (width) of each pattern protrusion Pa of the magnetic pattern to be transferred is smaller than the size (width) of the pattern groove Gb. As in the seventh embodiment shown in FIG. 13, therefore, the magnetic pattern transfer master is easier to fabricate than the conventional magnetic pattern transfer master 300 (FIG. 12) in which the size (width) of each pattern groove is substantially the same as the size (width) of the pattern protrusion.

According to the 12th embodiment, the position of the magnetic pattern transfer master or the magnetic recording medium is displaced while repeating the magnetic pattern transfer using the magnetic pattern transfer master with the pattern protrusion narrower than the pattern groove. Without using a magnetic pattern transfer master of very high density, therefore, a magnetic pattern of higher resolution and shorter period than in the prior art can be transferred to the vertical magnetic recording medium.

FIG. 27 is a schematic diagram for explaining a magnetic pattern transfer method according to a 13th embodiment of the present invention. Also in this case, the magnetic pattern transfer master used to transfer the magnetic pattern and the vertical magnetic recording medium are shown in a partly enlarged form. Further, to simplify the explanation, it is assumed that the magnetic pattern is transferred once using the magnetic pattern transfer master.

In the case in which the vertical magnetic recording medium 1 to which the magnetic pattern is to be transferred is fabricated in the 13th embodiment shown in FIG. 27, an underlayer 1-2b is formed on a nonmagnetic medium base 1-1, and a magnetic film 1-2a is formed on the underlayer 1-2b. Further, a protective film and a lubricant layer (none of which is shown) are formed on the magnetic film 1-2a thereby to complete the whole process of forming the films of the vertical magnetic recording medium 1a. According to the 13th embodiment, unlike in the 12th embodiment, the underlayer 1-2b making up the substrate of the magnetic film 1-2a is formed between the medium base 1-1a and the magnetic film 1-2a of the vertical magnetic recording medium 1a.

According to the 13th embodiment, a sufficiently large magnetic field is applied in a specified direction (for example, the direction perpendicular to the surface of the magnetic film 1-2a) to the vertical magnetic recording medium 1a thus fabricated, and all the portions of the magnetic film 1-2a on the medium base 1-1a are initialized.

Further, in the magnetic pattern transfer session using the magnetic pattern transfer master 3a in which each pattern protrusion Pa of the magnetic pattern is narrower than the pattern groove Gb, as shown in FIG. 27, the magnetic pattern transfer master 3a is brought in proximity to the vertical magnetic recording medium 1a. Furthermore, a permanent magnet MGa is arranged to supply a predetermined magnetic field in the direction perpendicular to the surface of the magnetic portions 4a of the magnetic pattern transfer master 3a and the surface of the magnetic film 1-2a of the vertical magnetic recording medium 1a, and a predetermined applied magnetic field EF generated from the permanent magnet MGa is applied to the magnetic pattern transfer master 3a.

In other words, according to the 13th embodiment, the applied magnetic field EF is supplied from an external source by the permanent magnet MGa or the like in such a manner that a magnetic field loop ML is formed by the magnetic pattern protrusions Pa of the magnetic pattern transfer master 1a and the magnetic film 1-2a and the underlayer 1-2b of the vertical magnetic recording medium 1a.

The externally applied magnetic field EF magnetizes the pattern protrusions Pa of the magnetic patterns of the magnetic portions 4a in the same direction as the applied magnetic field EF (i.e. the direction perpendicular to the surfaces of the magnetic pattern transfer master 3a and the vertical magnetic recording medium 1a). The magnetic field from the pattern protrusions Pa thus magnetized in turn magnetizes the magnetic film 1-2a of the vertical magnetic recording medium 1a in the same direction as the externally applied magnetic field EF, so that the magnetic patterns MPa each having the same size as the pattern protrusion Pa of the magnetic pattern of the magnetic pattern transfer master 3a are transferred to the magnetic film 1-2a of the vertical magnetic recording medium 1a.

According to the 13th embodiment, the magnetic field is applied in concentrated form to the magnetic film 1-2a of the vertical magnetic recording medium 1a through the pattern protrusions Pa of the magnetic portions 4a by the magnetic field loop ML and the externally applied magnetic field EF.

According to the 13th embodiment shown in FIG. 27, therefore, in the case in which the magnetic pattern is transferred to the magnetic film 1-2 of the vertical magnetic recording medium 1, the external magnetic field EF can be efficiently applied to the pattern protrusions Pa of the magnetic portions 4a. Thus, the magnetic film 1-2 of the vertical magnetic recording medium 1 is efficiently supplied with the applied magnetic field EF from an external source. Even in the case in which the externally applied magnetic field EF is not so strong, therefore, the magnetic patterns MPa of high resolution can be transferred to the magnetic recording medium 1.

Figure 28:
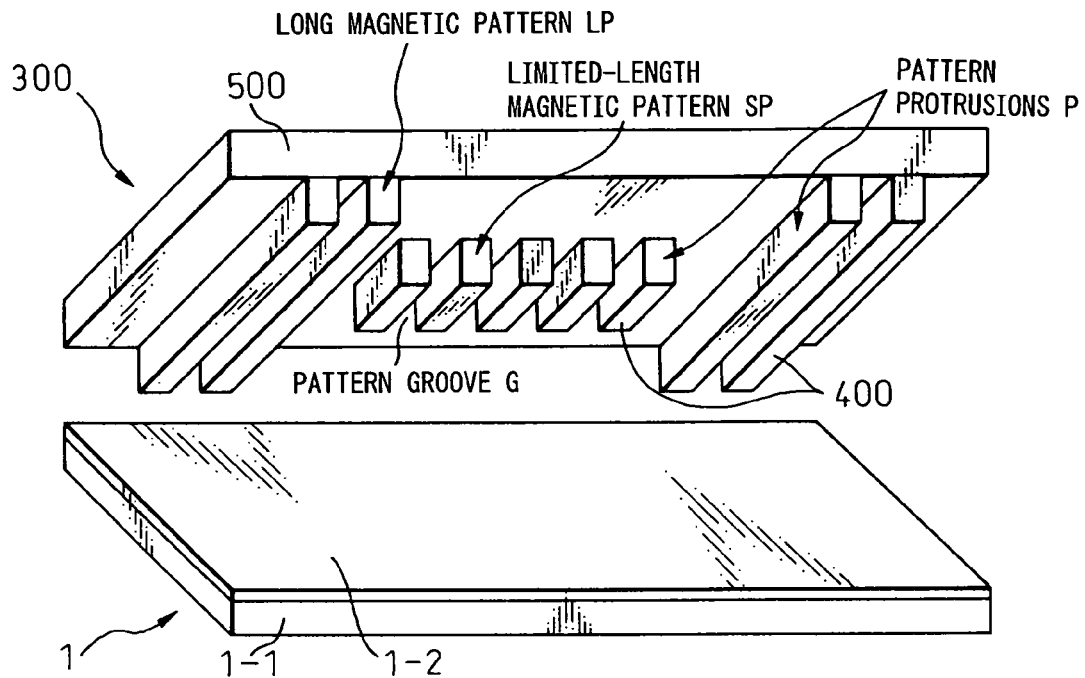
FIG. 28 is a schematic diagram for explaining the conventional magnetic pattern transfer method in the presence of a magnetic pattern of a limited length.
Figure 29:
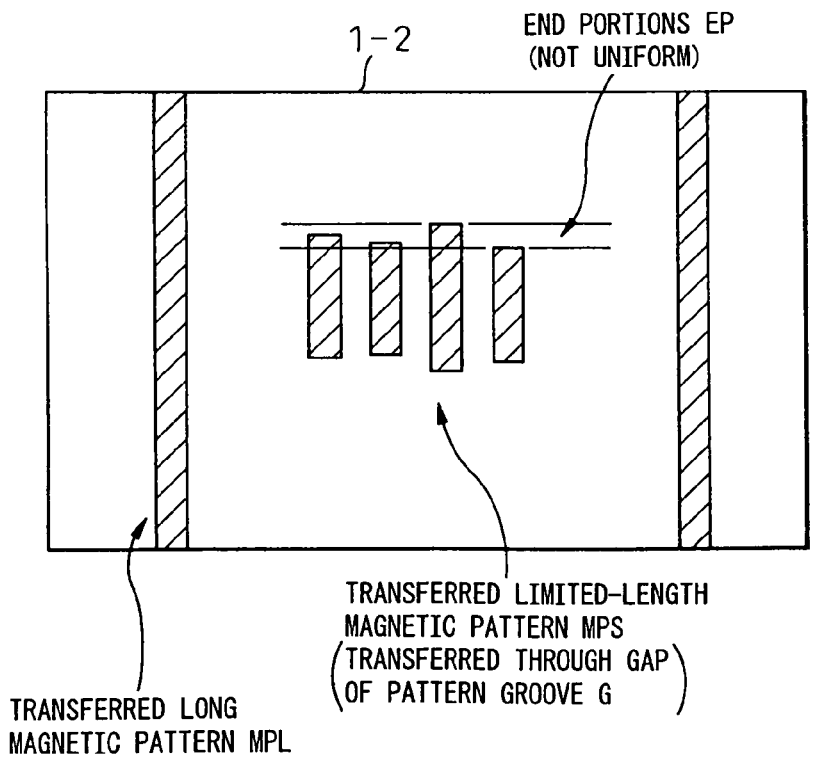
FIG. 29 is a schematic diagram for explaining the problem points of the magnetic pattern transfer method shown in FIG. 28.

FIG. 28 is a schematic diagram for explaining the conventional magnetic pattern transfer method in the presence of a magnetic pattern of a finite length, and FIG. 29 a schematic diagram for explaining the problem points of the magnetic pattern transfer method shown in FIG. 28.

In FIG. 28, the magnetic pattern transfer master used to transfer the magnetic pattern and the magnetic recording medium are partly shown in enlarged form. In FIG. 29, on the other hand, the magnetic recording medium to which the magnetic pattern is transferred is shown partly in enlarged form. Further, a method of transferring the magnetic pattern to the magnetic recording medium 1 for horizontal magnetic recording is explained.

In FIG. 28, as in the case of FIG. 12 described above, first of all, a magnetic pattern transfer master 300 having magnetic portions 400 preformed with uneven magnetic patterns (LP, SP) having pattern grooves G' and pattern protrusions P' is brought in proximity to the magnetic recording medium 1. The size (width) of each pattern groove G' and the size (width) of the pattern protrusion P' are substantially equal to each other. Next, a permanent magnet (not shown) is arranged in such a manner as to cover the magnetic portions 400 on the master base 500 of the magnetic pattern transfer master 300, and a predetermined applied magnetic field generated from the permanent magnet is applied to the magnetic pattern transfer master 300.

In the magnetic portions 400 of the magnetic pattern transfer master 300, assume that a sufficiently long magnetic pattern LP and a magnetic pattern SP having a finite length are configured of the pattern protrusions P'. The applied magnetic field from the permanent magnet magnetizes the pattern protrusions P' of the magnetic patterns LP, SP in the same direction as the applied magnetic field (i.e. the direction parallel to the surface of the magnetic pattern transfer master 300 and the magnetic recording medium 1) thereby to generate a magnetic field in the particular magnetic pattern. In the process, leakage magnetic fluxes are generated in the pattern groove G' between adjacent magnetic patterns. The magnetic field due to the leakage magnetic fluxes magnetizes the magnetic film 1-2 on the medium base 1-1 of the magnetic recording medium 1 in the same direction as the externally applied magnetic field, so that the magnetic patterns MP each having a size substantially corresponding to the pattern groove G' (or the pattern protrusion P') of the magnetic pattern are transferred to the magnetic film 1-2 of the magnetic recording medium 1.

Finally, as shown in FIG. 29, sufficiently long magnetic patterns LP and magnetic patterns SP of a finite length are transferred to the magnetic film 1-2 of the magnetic recording medium 1 in the gaps of the pattern grooves G'. Thus, the long magnetic patterns MPL transferred and the finite-length magnetic patterns MPS transferred are formed on the magnetic film 1-2.

In the case in which a plurality of magnetic patterns MPS of finite length are configured of the pattern protrusions P' as shown in FIG. 28, however, the magnetic field due to the leakage magnetic fluxes generated at the end portion EP of the finite-length magnetic patterns MPS is weakened. As a result, the strength inclination of the magnetic field generated at the end portion of the finite-length magnetic patterns MPS is decreased. With the decrease in the strength inclination of the magnetic field, the ease with which the magnetic film 1-2 of the magnetic recording medium 1 can be magnetized becomes irregular, which increases the variation of the end portion EP of each finite-length magnetic pattern MPS transferred to the magnetic film 1-2, resulting in an irregular length of each finite-length magnetic pattern MPS.

In the magnetic pattern transfer method according to the present invention, in contrast, assume that a plurality of finite-length magnetic patterns are configured of pattern grooves. The magnetic pattern is transferred to the magnetic film of the magnetic recording medium using the magnetic pattern transfer master formed in such a manner that the corner portion of the particular magnetic pattern is round. Then, the width of each pattern groove at the end portion of the magnetic patterns is relatively narrowed, and therefore the length of the finite-length magnetic patterns of the magnetic film after transfer is prevented from becoming irregular, and a plurality of finite-length magnetic patterns can be transferred with high definition to the magnetic recording medium.

With reference to the accompanying drawings (FIGS. 30 to 32), the magnetic pattern transfer method according to 14th and 15th embodiments of the present invention is explained below in detail.

Figure 30:
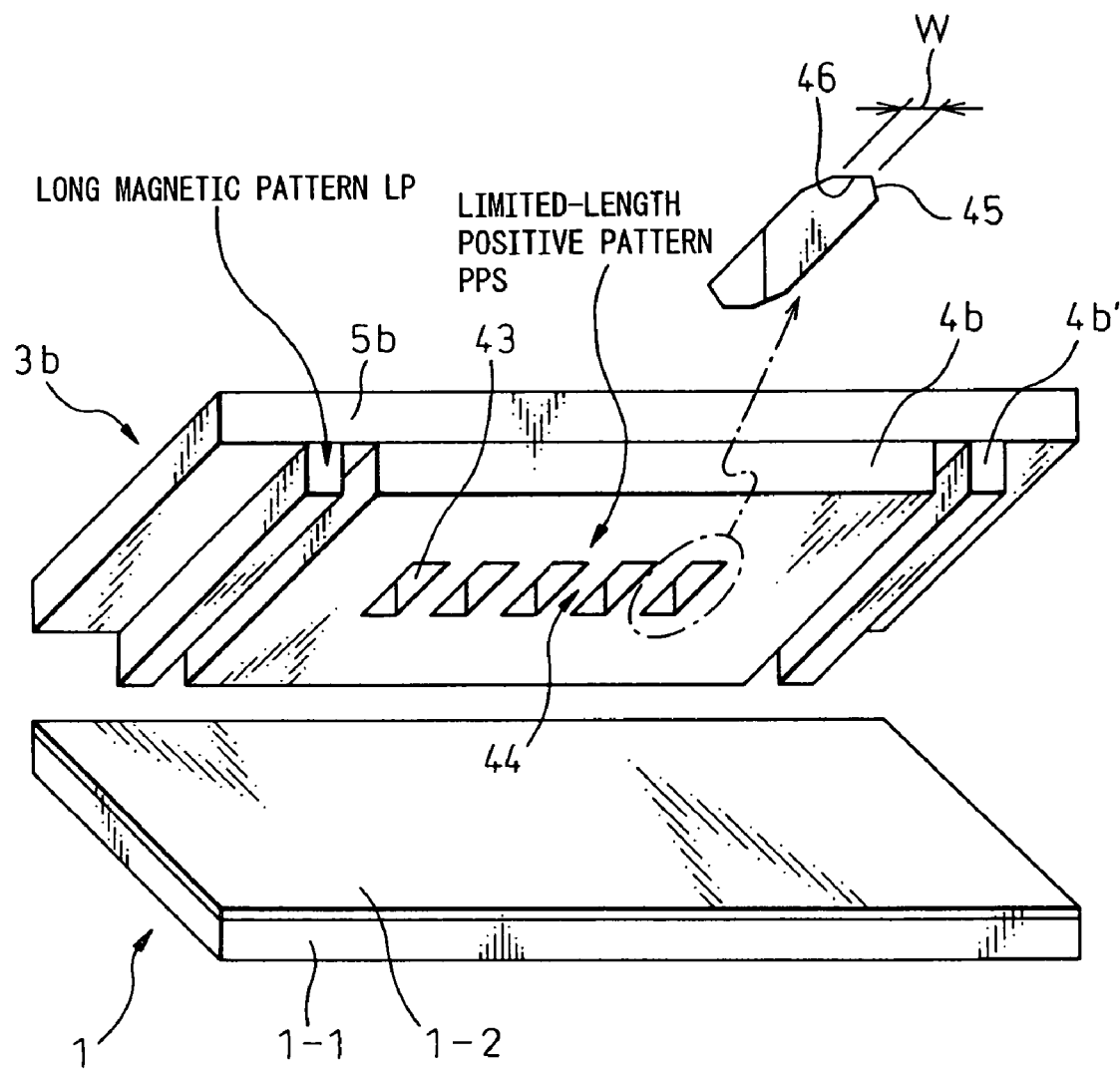
FIG. 30 is a first schematic diagram for explaining the magnetic pattern transfer method according to a 14th embodiment of the present invention.
Figure 31:
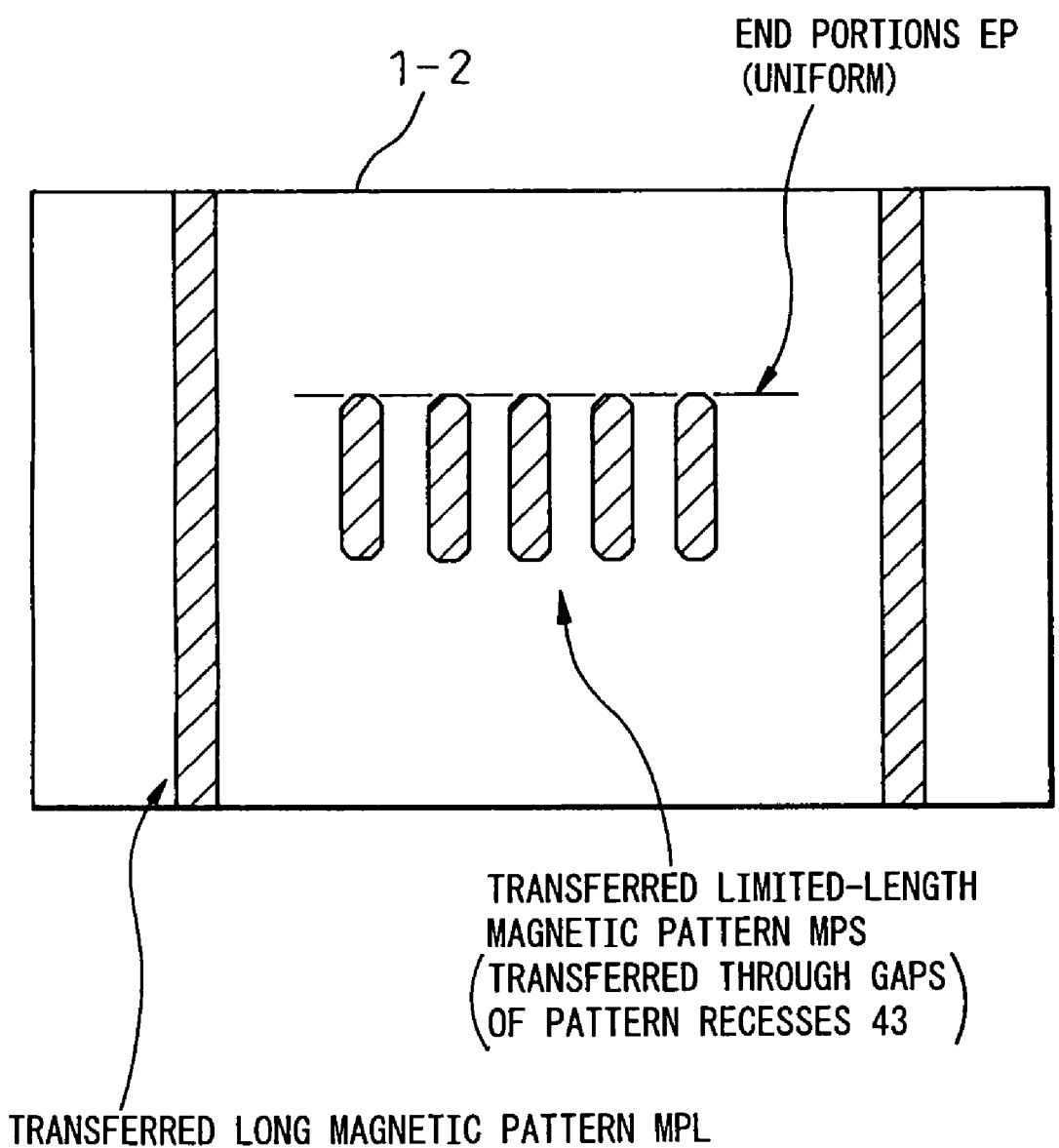
FIG. 31 is a second schematic diagram for explaining the magnetic pattern transfer method according to a 14th embodiment of the present invention.

FIG. 30 is a first schematic diagram for explaining the magnetic pattern transfer method according to the 14th embodiment of the present invention, and FIG. 31 a second schematic diagram for explaining the magnetic pattern transfer method according to the 14th embodiment of the present invention.

In FIG. 30, the magnetic pattern transfer master and the magnetic recording medium used for magnetic pattern transfer are partly shown in enlarged form. Also, in FIG. 31, the magnetic recording medium to which the magnetic pattern is transferred is partly shown in exaggerated form. A method of transferring the magnetic pattern to the magnetic recording medium 1 for horizontal magnetic recording is explained below.

According to the 14th embodiment shown in FIGS. 30, 31, a plurality of finite-length magnetic patterns SPP of the magnetic portions 4b of the magnetic pattern transfer master 3b are configured of pattern recesses (grooves) 43. The pattern corners 45 of the end portion EP of these finite-length magnetic patterns SPP are chamfered thereby to form the magnetic pattern with substantially round end corners EP. In the magnetic portions 4b' of the magnetic pattern transfer master 3b, however, the sufficiently long magnetic patterns LP, as in the case of FIG. 28, are configured of pattern protrusions 44.

In the case in which a magnetic pattern is transferred in FIG. 30, first of all, a magnetic pattern transfer master 3b including magnetic portions 4b, 4b' preformed with uneven magnetic patterns (LP, SPP) having pattern recesses 43 and pattern protrusions 44 is brought in proximity to the magnetic recording medium 1. The size (width) of each pattern recess and the size (width) of the pattern protrusion are substantially equal to each other. It should be noted, however, that unlike the case of FIG. 28, a plurality of finite-length magnetic patterns SPP constitute grooved pattern recesses. Next, a permanent magnet (not shown) is arranged in such a manner as to cover the magnetic portions 4b, 4b' of the magnetic pattern transfer master 3b, and a predetermined magnetic field generated from the permanent magnet is applied to the magnetic pattern transfer master 3b.

The externally applied magnetic field magnetizes the sufficiently long pattern protrusions LP and a plurality of the finite-length magnetic patterns SPP in the same direction as the applied magnetic field (i.e. the direction parallel to the surfaces of the magnetic pattern transfer master 3b and the magnetic recording medium 1) thereby to generate a magnetic field in the magnetic patterns LP, SPP. In the process, leakage magnetic fluxes are generated in the pattern groove G or the pattern recess 43 between each adjacent magnetic patterns. The magnetic field due to the leakage magnetic fluxes magnetizes the magnetic film 1-2 on the medium base 1-1 of the magnetic recording medium 1 in the same direction as the externally applied magnetic field, so that the magnetic patterns each having a size substantially corresponding to the pattern groove recess 43 (or the pattern protrusion 44) of the magnetic pattern of the magnetic pattern transfer master 3 are transferred to the magnetic film 1-2 of the magnetic recording medium 1.

Finally, as shown in FIG. 31, sufficiently long magnetic patterns LP and magnetic patterns SP of a finite length are transferred to the magnetic film 1-2 of the magnetic recording medium 1 in the gaps of the pattern grooves G or the pattern recesses 43. Thus, the long magnetic patterns MPL transferred and the finite-length magnetic patterns MPS transferred are formed on the magnetic film 1-2.

According to the 14th embodiment shown in FIGS. 30, 31, as described above, a plurality of finite-length magnetic patterns SPP are configured of pattern recesses 43 and so shaped that the corner of each end portion EP of the magnetic patterns is substantially rounded. Further, the magnetic pattern is transferred to the magnetic film 1-2 of the magnetic recording medium 1 using the magnetic pattern transfer master 3b formed with the particular magnetic patterns.

In the 14th embodiment, therefore, in the case in which the magnetic pattern transfer master 3b is fabricated by exposing the resist and etching the magnetic layer, therefore, the width W of the transverse pattern portion 46 of the pattern recess 43 at the end portion (end portion EP) of a plurality of finite-length magnetic patterns SPP is relatively narrowed, so that the strength inclination of the magnetic field generated at the end portion of the particular magnetic pattern becomes more steep than in the prior art. As a result, the boundary becomes clear between magnetization and non-magnetization at each end portion of the magnetic pattern transferred to the magnetic film 1-2 of the magnetic recording medium 1. Thus, the finite-length magnetic patterns SPP of the magnetic film 1-2 after transfer come to assume a uniform length. In this way, a plurality of finite-length magnetic patterns SPP can be transferred with high definition to the magnetic recording medium 1.

More specifically, in fabricating the magnetic pattern transfer master 3b used for the limited-length magnetic pattern transfer method, a magnetic layer including the magnetic portions 4b is formed by the vacuum deposition method on a nonmagnetic master base 1-1 such as a silicon substrate at the first step. A positive resist is coated and exposed on the magnetic layer. A positive pattern is formed on the magnetic layer of the magnetic pattern transfer master 3b. At the second step, with a positive pattern formed on the magnetic layer by a positive resist, the magnetic layer is etched in such a manner as to form pattern recesses of a plurality of limited-length magnetic patterns SPP. The magnetic patterns of the magnetic layer including a plurality of the limited-length magnetic patterns SPP formed this way have the same shape as the positive pattern formed by the positive resist.

The width W of the pattern recess 43 at the end portion of each limited-length magnetic pattern SPP is smaller than the width of the central portion of the pattern recess 43. As a result, the strength inclination of the magnetic field generated at the end portion of the magnetic pattern becomes steeper than in the prior art. Therefore, the limited-length magnetic patterns SPP of the magnetic film 1-2 after transfer have a uniform length, and therefore can be easily transferred with high definition to the magnetic recording medium 1.

FIG. 32 is a schematic diagram for explaining a magnetic pattern transfer method according to a 15th embodiment of the present invention. In this case, however, the magnetic pattern transfer master used for magnetic pattern transfer is partly shown in enlarged form. Further, a method of transferring the magnetic patterns to the magnetic recording medium 1 for horizontal magnetic recording is explained below.

In FIG. 32, in order to facilitate the comparison between the magnetic pattern transfer master 300 used for the conventional magnetic pattern transfer method and the magnetic pattern transfer master 3c used in the magnetic pattern transfer method according to the 15th embodiment of the present invention, the magnetic pattern transfer master 300 according to the prior art and the magnetic pattern transfer master 3c according to the 15th embodiment of the present invention are shown in the upper half portion (portion (a)) and the lower half portion (portion (b)), respectively, of FIG. 32.

The magnetic pattern transfer master 300 according to the prior art shown in portion (a) of FIG. 32 has the same configuration as the magnetic pattern transfer master 300 shown in FIG. 28. Therefore, the magnetic pattern transfer master 300 according to the prior art is not explained again.

In the magnetic pattern transfer master 3c according to the 15th embodiment of the present invention as shown in portion (b) of FIG. 32, a plurality of limited-length magnetic patterns SPP are configured of pattern recesses (grooves) 43, and sufficiently long magnetic patterns (long positive patterns) PPL other than the magnetic patterns SPP are also configured of the pattern recesses 47.

In other words, the pattern grooves of the long magnetic patterns LP of the magnetic pattern transfer master 300 according to the prior art correspond to the pattern protrusions 44 of the magnetic pattern transfer master 3c according to the 15th embodiment of the present invention, while the pattern protrusions of the long magnetic patterns LP of the magnetic pattern transfer master 300 according to the prior art correspond to the pattern recesses 47 of the magnetic pattern transfer master 3c according to the 15th embodiment.

Further, in the magnetic pattern transfer master 3c according to the 15th embodiment of the present invention shown in portion (b) of FIG. 32, the portion other than the pattern block including all the magnetic patterns LP, SPP is depressed so that the pattern block is protruded as a whole. More specifically, the side wall portions 49 of the steps at the ends of the pattern block have a smaller inclination.

As is obvious from portion (b) of FIG. 32, according to the 15th embodiment described above, the area of the pattern protrusions 44, 48 is larger than the area of the pattern recesses 43, 47 of the magnetic patterns of the magnetic pattern transfer master 3c. Therefore, in the case where the magnetic patterns are transferred to the magnetic film 1-2 on the medium base 1-1 of the magnetic recording medium 1 in the 15th embodiment, the area of the surface of the pattern protrusions in contact with the surface of the magnetic film 1-2 is relatively increased, thereby improving the closeness between the magnetic recording medium 1 and the magnetic pattern transfer master 3c.

The invention claimed is:

1. A magnetic pattern transfer method in which a magnetic pattern transfer master having a plurality of magnetic portions preformed with predetermined magnetic patterns is brought in proximity to a magnetic recording medium having a magnetic film for recording the magnetic information, and the magnetic patterns are transferred to the magnetic recording medium by applying a magnetic field thereto from an external source,
   wherein in order to improve the closeness between the magnetic film of the magnetic recording medium and the magnetic portions of the magnetic pattern transfer master, the magnetic patterns are transferred to the magnetic film of the magnetic recording medium during the process of fabricating the magnetic recording medium, and
   wherein before forming a protective film after forming the magnetic film during the process of fabricating the magnetic recording medium, the magnetic patterns are transferred in a vacuum in an environment coupled to a chamber for forming the magnetic film.

2. A magnetic pattern transfer method in which a magnetic pattern transfer master having a plurality of magnetic portions preformed with predetermined magnetic patterns is brought in proximity to a magnetic recording medium having a magnetic film for recording the magnetic information, and the magnetic patterns are transferred to the magnetic recording medium by applying a magnetic field thereto from an external source,
   wherein in order to improve the closeness between the magnetic film of the magnetic recording medium and the magnetic portions of the magnetic pattern transfer master, the magnetic patterns are transferred to the magnetic film of the magnetic recording medium during the process of fabricating the magnetic recording medium, and
   wherein before forming a protective film after forming the magnetic film during the process of fabricating the magnetic recording medium, the magnetic patterns are transferred in an inert gas in an environment coupled to a chamber for forming the magnetic film.

3. A magnetic pattern transfer method in which a magnetic pattern transfer master having a plurality of magnetic portions preformed with predetermined magnetic patterns is brought in proximity to a magnetic recording medium having a magnetic film for recording the magnetic information, and the magnetic patterns are transferred to the magnetic recording medium by applying a magnetic field thereto from an external source,
   wherein in order to improve the closeness between the magnetic film of the magnetic recording medium and the magnetic portions of the magnetic pattern transfer master, the magnetic patterns are transferred to the magnetic film of the magnetic recording medium during the process of fabricating the magnetic recording medium,
   wherein after forming the magnetic film and a part of a protective film during the process of fabricating the magnetic recording medium, the magnetic patterns are transferred in a vacuum in an environment coupled to a chamber for forming the magnetic film, and
   wherein the remaining portion of the protective film is formed after transfer of the magnetic patterns.

4. A magnetic pattern transfer method in which a magnetic pattern transfer master having a plurality of magnetic portions preformed with predetermined magnetic patterns is brought in proximity to a magnetic recording medium having a magnetic film for recording the magnetic information, and the magnetic patterns are transferred to the magnetic recording medium by applying a magnetic field thereto from an external source,
   wherein in order to improve the closeness between the magnetic film of the magnetic recording medium and the magnetic portions of the magnetic pattern transfer master, the magnetic patterns are transferred to the magnetic film of the magnetic recording medium during the process of fabricating the magnetic recording medium,
   wherein after forming the magnetic film and a part of a protective film during the process of fabricating the magnetic recording medium, the magnetic patterns are transferred in an inert gas in an environment coupled to a chamber for forming the magnetic film, and
   wherein the remaining portion of the protective film is formed after transfer of the magnetic patterns.

* * * * *